US011212593B2

(12) United States Patent
Borok et al.

(10) Patent No.: US 11,212,593 B2
(45) Date of Patent: Dec. 28, 2021

(54) APPARATUS AND METHODS FOR AUTOMATED SECONDARY CONTENT MANAGEMENT IN A DIGITAL NETWORK

(71) Applicant: Time Warner Cable Enterprises LLC, New York, NY (US)

(72) Inventors: Jay L. Borok, New York, NY (US); Seth Freudenburg, New York, NY (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 1284 days.

(21) Appl. No.: 15/277,840

(22) Filed: Sep. 27, 2016

(65) Prior Publication Data

US 2018/0091868 A1 Mar. 29, 2018

(51) Int. Cl.
*H04N 21/81* (2011.01)
*H04N 21/458* (2011.01)
(Continued)

(52) U.S. Cl.
CPC ....... *H04N 21/812* (2013.01); *G06Q 30/0242* (2013.01); *H04N 21/2385* (2013.01);
(Continued)

(58) Field of Classification Search
CPC ............. H04N 21/812; H04N 21/2385; H04N 21/25841; H04N 21/26241;
(Continued)

(56) References Cited

U.S. PATENT DOCUMENTS 4,521,881 A 6/1985 Stapleford et al.
4,546,382 A 10/1985 McKenna et al.
(Continued)

FOREIGN PATENT DOCUMENTS

WO WO-0110125 A1 2/2001
WO WO-0191474 A2 11/2001
(Continued)

OTHER PUBLICATIONS

John Rampton, 7 worthwhile ways to automate social media, 2016 (Year: 2016).*
(Continued)

*Primary Examiner* — Tarek Elchanti
(74) *Attorney, Agent, or Firm* — Gazdzinski & Associates, PC

(57) ABSTRACT

Apparatus and methods for generating secondary content scheduling and product offerings for users of a managed content distribution network, such as a cable, satellite, of HFCu network. In one embodiment, the secondary content comprises advertising content to be distributed across a plurality of content networks carried by the managed content distribution network. A plurality of computerized models (including various simulations) are generated based on various data sources, including historical tuning event data for the managed network's subscribers), and subsequently implemented to structure advertising schedules or campaigns ("bundles") for each customer in a substantially automated fashion, and that will achieve the desired level of performance specified by the customer, consistent with their budget. Hence, the customer is relieved of having to possess any intrinsic knowledge of advertising channels, demographics (and their correlation to certain content networks), and can merely specify a desired result in terms of e.g., reach and/or viewing frequency.

24 Claims, 20 Drawing Sheets

(51) Int. Cl.
*H04N 21/262* (2011.01)
*H04N 21/258* (2011.01)
*H04N 21/2385* (2011.01)
*G06Q 30/02* (2012.01)

(52) U.S. Cl.
CPC ............... *H04N 21/25841* (2013.01); *H04N 21/26241* (2013.01); *H04N 21/458* (2013.01)

(58) Field of Classification Search
CPC ............ H04N 21/2668; H04N 21/458; G06Q 30/0242; G06Q 30/0283
USPC ...................................... 705/14.41; 715/200
See application file for complete search history.

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,373,315 A | 12/1994 | Dufresne et al. |
| 5,481,294 A | 1/1996 | Thomas et al. |
| 5,497,185 A | 3/1996 | Dufresne et al. |
| 5,528,284 A | 6/1996 | Iwami et al. |
| 5,600,364 A | 2/1997 | Hendricks et al. |
| 5,675,647 A | 10/1997 | Garneau et al. |
| 5,708,961 A | 1/1998 | Hylton et al. |
| 5,758,257 A | 5/1998 | Herz et al. |
| 5,774,170 A | 6/1998 | Hite et al. |
| 5,793,409 A | 8/1998 | Tetsumura |
| 5,812,642 A | 9/1998 | Leroy |
| 5,818,438 A | 10/1998 | Howe et al. |
| 5,842,221 A | 11/1998 | Schmonsees |
| 5,862,312 A | 1/1999 | Mann et al. |
| 5,913,040 A | 6/1999 | Rakavy et al. |
| 5,914,945 A | 6/1999 | Abu-Amara et al. |
| 5,929,849 A | 7/1999 | Kikinis |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,016,316 A | 1/2000 | Moura et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,124,878 A | 9/2000 | Adams et al. |
| 6,134,532 A | 10/2000 | Lazarus et al. |
| 6,161,142 A | 12/2000 | Wolfe et al. |
| 6,167,432 A | 12/2000 | Jiang |
| 6,169,728 B1 | 1/2001 | Perreault et al. |
| 6,177,931 B1 | 1/2001 | Alexander et al. |
| 6,181,697 B1 | 1/2001 | Nurenberg et al. |
| 6,182,050 B1 | 1/2001 | Ballard |
| 6,202,210 B1 | 3/2001 | Ludtke |
| 6,211,901 B1 | 4/2001 | Imajima et al. |
| 6,216,129 B1 | 4/2001 | Eldering |
| 6,219,710 B1 | 4/2001 | Gray et al. |
| 6,259,701 B1 | 7/2001 | Shur et al. |
| 6,272,176 B1 | 8/2001 | Srinivasan |
| 6,282,713 B1 | 8/2001 | Kitsukawa et al. |
| 6,292,624 B1 | 9/2001 | Saib et al. |
| 6,330,609 B1 | 12/2001 | Garofalakis et al. |
| 6,389,538 B1 | 5/2002 | Gruse et al. |
| 6,396,055 B1 | 5/2002 | Biedendorf |
| 6,446,261 B1 | 9/2002 | Rosser |
| 6,463,585 B1 | 10/2002 | Hendricks et al. |
| 6,467,089 B1 | 10/2002 | Aust et al. |
| 6,502,076 B1 | 12/2002 | Smith |
| 6,519,062 B1 | 2/2003 | Yoo |
| 6,523,696 B1 | 2/2003 | Saito et al. |
| 6,549,718 B1 | 4/2003 | Grooters et al. |
| 6,560,578 B2 | 5/2003 | Eldering |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,640,145 B2 | 10/2003 | Hoffberg et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,694,145 B2 | 2/2004 | Riikonen et al. |
| 6,700,624 B2 | 3/2004 | Yun |
| 6,704,930 B1 | 3/2004 | Eldering et al. |
| 6,718,551 B1 | 4/2004 | Swix et al. |
| 6,725,461 B1 | 4/2004 | Dougherty et al. |
| 6,738,978 B1 | 5/2004 | Hendricks et al. |
| 6,742,187 B1 | 5/2004 | Vogel |
| 6,769,127 B1 | 7/2004 | Bonomi et al. |
| 6,771,290 B1 | 8/2004 | Hoyle |
| 6,775,843 B1 | 8/2004 | McDermott |
| 6,785,901 B1 | 8/2004 | Horiwitz et al. |
| 6,788,676 B2 | 9/2004 | Partanen et al. |
| 6,813,776 B2 | 11/2004 | Chernock et al. |
| 6,859,845 B2 | 2/2005 | Mate |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna, Jr. |
| 6,917,614 B1 | 7/2005 | Laubach et al. |
| 6,917,641 B2 | 7/2005 | Kotzin et al. |
| 6,925,257 B2 | 8/2005 | Yoo |
| 6,944,150 B1 | 9/2005 | McConnell et al. |
| 6,990,680 B1 | 1/2006 | Wugofski |
| 7,006,881 B1 | 2/2006 | Hoffberg et al. |
| 7,009,972 B2 | 3/2006 | Maher et al. |
| 7,017,179 B1 | 3/2006 | Asamoto et al. |
| 7,024,676 B1 | 4/2006 | Klopfenstein |
| 7,027,460 B2 | 4/2006 | Iyer et al. |
| 7,039,048 B1 | 5/2006 | Monta et al. |
| 7,039,928 B2 | 5/2006 | Kamada et al. |
| 7,054,902 B2 | 5/2006 | Toporek et al. |
| 7,068,639 B1 | 6/2006 | Varma et al. |
| 7,075,945 B2 | 7/2006 | Arsenault et al. |
| 7,099,308 B2 | 8/2006 | Merrill et al. |
| 7,100,183 B2 | 8/2006 | Kunkel et al. |
| 7,106,382 B2 | 9/2006 | Shiotsu |
| 7,109,848 B2 | 9/2006 | Schybergson |
| 7,143,431 B1 | 11/2006 | Eager et al. |
| 7,146,627 B1 | 12/2006 | Ismail et al. |
| 7,149,772 B1 | 12/2006 | Kalavade |
| 7,152,237 B2 | 12/2006 | Flickinger et al. |
| 7,155,508 B2 | 12/2006 | Sankuratripati et al. |
| 7,174,126 B2 | 2/2007 | McElhatten et al. |
| 7,174,127 B2 | 2/2007 | Otten et al. |
| 7,174,385 B2 | 2/2007 | Li |
| 7,191,461 B1 | 3/2007 | Arsenault et al. |
| 7,197,472 B2 | 3/2007 | Conkwright et al. |
| 7,209,458 B2 | 4/2007 | Ahvonen et al. |
| 7,213,036 B2 | 5/2007 | Apparao et al. |
| 7,222,078 B2 | 5/2007 | Abelow |
| 7,228,555 B2 | 6/2007 | Schlack |
| 7,237,250 B2 | 6/2007 | Kanojia et al. |
| 7,242,960 B2 | 7/2007 | Van et al. |
| 7,242,988 B1 | 7/2007 | Hoffberg et al. |
| 7,246,150 B1 | 7/2007 | Donoho et al. |
| 7,246,172 B2 | 7/2007 | Yoshiba et al. |
| 7,254,608 B2 | 8/2007 | Yeager et al. |
| 7,266,836 B2 | 9/2007 | Anttila et al. |
| 7,280,737 B2 | 10/2007 | Smith |
| 7,281,261 B2 | 10/2007 | Jaff et al. |
| 7,317,728 B2 | 1/2008 | Acharya et al. |
| 7,325,073 B2 | 1/2008 | Shao et al. |
| 7,327,692 B2 | 2/2008 | Ain et al. |
| 7,330,483 B1 | 2/2008 | Peters, Jr. et al. |
| 7,352,775 B2 | 4/2008 | Powell |
| 7,355,980 B2 | 4/2008 | Bauer et al. |
| 7,356,751 B1 | 4/2008 | Levitan |
| 7,357,775 B1 | 4/2008 | Koh |
| 7,363,371 B2 | 4/2008 | Kirby et al. |
| 7,363,643 B2 | 4/2008 | Drake et al. |
| 7,367,043 B2 | 4/2008 | Dudkiewicz et al. |

(56) References Cited

U.S. PATENT DOCUMENTS

| | | | |
|---|---|---|---|
| 7,369,750 B2 | 5/2008 | Cheng et al. |
| 7,376,386 B2 | 5/2008 | Phillips et al. |
| 7,444,655 B2 | 10/2008 | Sardera |
| 7,457,520 B2 | 11/2008 | Rosetti et al. |
| 7,486,869 B2 | 2/2009 | Alexander et al. |
| 7,567,983 B2 | 7/2009 | Pickelsimer et al. |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,603,529 B1 | 10/2009 | MacHardy et al. |
| 7,650,319 B2 | 1/2010 | Hoffberg et al. |
| 7,690,020 B2 | 3/2010 | Lebar |
| 7,693,171 B2 | 4/2010 | Gould |
| 7,712,125 B2 | 5/2010 | Herigstad et al. |
| 7,720,432 B1 | 5/2010 | Colby et al. |
| 7,721,314 B2 | 5/2010 | Sincaglia et al. |
| 7,729,940 B2 | 6/2010 | Harvey et al. |
| 7,730,509 B2 | 6/2010 | Boulet et al. |
| 7,742,074 B2 | 6/2010 | Minatogawa |
| 7,763,360 B2 | 7/2010 | Paul et al. |
| 7,783,316 B1 | 8/2010 | Mitchell |
| 7,801,803 B2 | 9/2010 | Forlai |
| 7,809,942 B2 | 10/2010 | Baran et al. |
| 7,889,765 B2 | 2/2011 | Brooks et al. |
| 7,900,052 B2 | 3/2011 | Jonas et al. |
| 7,900,229 B2 | 3/2011 | Dureau |
| 7,954,131 B2 | 5/2011 | Cholas et al. |
| 8,024,762 B2 | 9/2011 | Britt |
| 8,028,322 B2 | 9/2011 | Riedl et al. |
| 8,042,131 B2 | 10/2011 | Flickinger |
| 8,065,703 B2 | 11/2011 | Wilson et al. |
| 8,073,460 B1 | 12/2011 | Scofield et al. |
| 8,078,696 B2 | 12/2011 | Lajoie et al. |
| 8,079,052 B2 | 12/2011 | Chen et al. |
| 8,090,014 B2 | 1/2012 | Cheung et al. |
| 8,090,104 B2 | 1/2012 | Wajs et al. |
| 8,095,610 B2 | 1/2012 | Gould et al. |
| 8,099,757 B2 | 1/2012 | Riedl et al. |
| 8,151,294 B2 | 4/2012 | Carlucci et al. |
| 8,156,520 B2 | 4/2012 | Casagrande et al. |
| 8,165,916 B2 | 4/2012 | Hoffberg et al. |
| 8,181,209 B2 | 5/2012 | Hasek et al. |
| 8,205,226 B2 | 6/2012 | Ko et al. |
| 8,214,256 B2 | 7/2012 | Riedl et al. |
| 8,280,982 B2 | 10/2012 | La et al. |
| 8,296,185 B2 | 10/2012 | Isaac |
| 8,296,643 B1 * | 10/2012 | Vasilik | G06F 16/958 715/200 |
| 8,341,242 B2 | 12/2012 | Dillon et al. |
| 8,347,341 B2 | 1/2013 | Markley et al. |
| 8,365,213 B1 | 1/2013 | Orlowski |
| 8,396,055 B2 | 3/2013 | Patel et al. |
| 8,396,056 B2 | 3/2013 | Dalton, Jr. et al. |
| 8,472,371 B1 | 6/2013 | Bari et al. |
| 8,484,511 B2 | 7/2013 | Engel et al. |
| 8,516,529 B2 | 8/2013 | Lajoie et al. |
| 8,561,113 B2 | 10/2013 | Cansler et al. |
| 8,561,116 B2 | 10/2013 | Hasek |
| 8,571,931 B2 | 10/2013 | Riedl et al. |
| 8,621,501 B2 | 12/2013 | Matheny et al. |
| 8,701,138 B2 | 4/2014 | Stern et al. |
| 8,769,559 B2 | 7/2014 | Moon et al. |
| 8,838,149 B2 | 9/2014 | Hasek |
| 9,021,566 B1 | 4/2015 | Panayotopoulos et al. |
| 9,215,423 B2 | 12/2015 | Kimble et al. |
| 2001/0001160 A1 | 5/2001 | Shoff et al. |
| 2001/0004768 A1 | 6/2001 | Hodge et al. |
| 2001/0013123 A1 | 8/2001 | Freeman et al. |
| 2002/0013943 A1 | 1/2002 | Haberman et al. |
| 2002/0026496 A1 | 2/2002 | Boyer et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0056125 A1 | 5/2002 | Hodge et al. |
| 2002/0059577 A1 | 5/2002 | Lu et al. |
| 2002/0059602 A1 | 5/2002 | Macrae et al. |
| 2002/0059619 A1 | 5/2002 | Lebar |
| 2002/0069404 A1 | 6/2002 | Copeman et al. |
| 2002/0073419 A1 | 6/2002 | Yen et al. |
| 2002/0077787 A1 | 6/2002 | Rappaport et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100063 A1 | 7/2002 | Herigstad et al. |
| 2002/0104083 A1 | 8/2002 | Hendricks et al. |
| 2002/0104096 A1 | 8/2002 | Cramer et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129368 A1 | 9/2002 | Schlack et al. |
| 2002/0144263 A1 | 10/2002 | Eldering et al. |
| 2002/0147771 A1 | 10/2002 | Traversat et al. |
| 2002/0147984 A1 | 10/2002 | Tomsen et al. |
| 2002/0152299 A1 | 10/2002 | Traversat et al. |
| 2002/0154655 A1 | 10/2002 | Gummalla et al. |
| 2002/0163928 A1 | 11/2002 | Rudnick et al. |
| 2002/0166119 A1 | 11/2002 | Cristofalo |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2002/0188744 A1 | 12/2002 | Mani |
| 2002/0194608 A1 | 12/2002 | Goldhor et al. |
| 2003/0004810 A1 | 1/2003 | Eldering |
| 2003/0005446 A1 | 1/2003 | Jaff et al. |
| 2003/0018977 A1 | 1/2003 | McKenna |
| 2003/0020744 A1 | 1/2003 | Ellis et al. |
| 2003/0030751 A1 | 2/2003 | Lupulescu et al. |
| 2003/0033199 A1 | 2/2003 | Coleman |
| 2003/0056217 A1 | 3/2003 | Brooks |
| 2003/0077067 A1 | 4/2003 | Wu et al. |
| 2003/0086422 A1 | 5/2003 | Klinker et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115601 A1 | 6/2003 | Palazzo et al. |
| 2003/0115612 A1 | 6/2003 | Mao et al. |
| 2003/0123465 A1 | 7/2003 | Donahue |
| 2003/0126244 A1 | 7/2003 | Smith et al. |
| 2003/0135513 A1 | 7/2003 | Quinn et al. |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0166401 A1 | 9/2003 | Combes et al. |
| 2003/0169234 A1 | 9/2003 | Kempisty |
| 2003/0172374 A1 | 9/2003 | Vinson et al. |
| 2003/0172376 A1 | 9/2003 | Coffin |
| 2003/0177495 A1 | 9/2003 | Needham et al. |
| 2003/0179865 A1 | 9/2003 | Stillman et al. |
| 2003/0198461 A1 | 10/2003 | Taylor et al. |
| 2003/0208767 A1 | 11/2003 | Williamson et al. |
| 2003/0217365 A1 | 11/2003 | Caputo |
| 2003/0220100 A1 | 11/2003 | McElhatten et al. |
| 2003/0229681 A1 | 12/2003 | Levitan |
| 2003/0237090 A1 | 12/2003 | Boston et al. |
| 2004/0030747 A1 | 2/2004 | Oppermann et al. |
| 2004/0034873 A1 | 2/2004 | Zenoni |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |

(56) References Cited

U.S. PATENT DOCUMENTS

| | | |
|---|---|---|
| 2004/0047599 A1 | 3/2004 | Grzeczkowski |
| 2004/0060076 A1 | 3/2004 | Song |
| 2004/0070678 A1 | 4/2004 | Toyama et al. |
| 2004/0073915 A1 | 4/2004 | Dureau |
| 2004/0078809 A1 | 4/2004 | Drazin |
| 2004/0083177 A1 | 4/2004 | Chen et al. |
| 2004/0103429 A1 | 5/2004 | Carlucci et al. |
| 2004/0109672 A1 | 6/2004 | Kim et al. |
| 2004/0117817 A1 | 6/2004 | Kwon et al. |
| 2004/0133467 A1 | 7/2004 | Siler |
| 2004/0133923 A1 | 7/2004 | Watson et al. |
| 2004/0137918 A1 | 7/2004 | Varonen et al. |
| 2004/0138909 A1 | 7/2004 | Mayer |
| 2004/0148625 A1 | 7/2004 | Eldering et al. |
| 2004/0163109 A1 | 8/2004 | Kang et al. |
| 2004/0163111 A1 | 8/2004 | Palazzo et al. |
| 2004/0177383 A1 | 9/2004 | Martinolich et al. |
| 2004/0181811 A1 | 9/2004 | Rakib |
| 2004/0186774 A1 | 9/2004 | Lee |
| 2004/0194134 A1 | 9/2004 | Gunatilake et al. |
| 2004/0199789 A1 | 10/2004 | Shaw et al. |
| 2004/0230994 A1 | 11/2004 | Urdang et al. |
| 2004/0255148 A1 | 12/2004 | Monteiro et al. |
| 2004/0268398 A1 | 12/2004 | Fano et al. |
| 2005/0002638 A1 | 1/2005 | Putterman et al. |
| 2005/0005308 A1 | 1/2005 | Logan et al. |
| 2005/0022237 A1 | 1/2005 | Nomura |
| 2005/0027696 A1 | 2/2005 | Swaminathan et al. |
| 2005/0028200 A1 | 2/2005 | Sardera |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0047596 A1 | 3/2005 | Suzuki |
| 2005/0055220 A1 | 3/2005 | Lee et al. |
| 2005/0055685 A1 | 3/2005 | Maynard et al. |
| 2005/0060229 A1 | 3/2005 | Riedl et al. |
| 2005/0060742 A1 | 3/2005 | Riedl et al. |
| 2005/0060745 A1 | 3/2005 | Riedl et al. |
| 2005/0086334 A1 | 4/2005 | Aaltonen et al. |
| 2005/0086691 A1 | 4/2005 | Dudkiewicz et al. |
| 2005/0105396 A1 | 5/2005 | Schybergson |
| 2005/0108763 A1 | 5/2005 | Baran et al. |
| 2005/0114141 A1 | 5/2005 | Grody |
| 2005/0114900 A1 | 5/2005 | Ladd et al. |
| 2005/0122393 A1 | 6/2005 | Cockerton et al. |
| 2005/0123001 A1 | 6/2005 | Craven et al. |
| 2005/0138656 A1 | 6/2005 | Moore et al. |
| 2005/0144635 A1 | 6/2005 | Boortz et al. |
| 2005/0160308 A1 | 7/2005 | Elcock et al. |
| 2005/0177855 A1 | 8/2005 | Maynard et al. |
| 2005/0188402 A1 | 8/2005 | De et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234779 A1 | 10/2005 | Chiu et al. |
| 2005/0234998 A1 | 10/2005 | Lesandrini et al. |
| 2005/0235318 A1 | 10/2005 | Grauch et al. |
| 2005/0251827 A1 | 11/2005 | Ellis et al. |
| 2005/0257242 A1 | 11/2005 | Montgomery et al. |
| 2005/0262542 A1 | 11/2005 | Deweese et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2006/0019702 A1 | 1/2006 | Anttila et al. |
| 2006/0020785 A1 | 1/2006 | Grawrock |
| 2006/0031883 A1 | 2/2006 | Ellis et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0059532 A1 | 3/2006 | Dugan et al. |
| 2006/0061682 A1 | 3/2006 | Bradley et al. |
| 2006/0080408 A1 | 4/2006 | Istvan et al. |
| 2006/0090186 A1 | 4/2006 | Santangelo et al. |
| 2006/0095940 A1 | 5/2006 | Yearwood |
| 2006/0117341 A1 | 6/2006 | Park |
| 2006/0117357 A1 | 6/2006 | Surline et al. |
| 2006/0128397 A1 | 6/2006 | Choti et al. |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0139379 A1 | 6/2006 | Toma et al. |
| 2006/0149850 A1 | 7/2006 | Bowman |
| 2006/0165082 A1 | 7/2006 | Pfeffer et al. |
| 2006/0171390 A1 | 8/2006 | La |
| 2006/0171423 A1 | 8/2006 | Helms et al. |
| 2006/0187900 A1 | 8/2006 | Akbar |
| 2006/0190336 A1 | 8/2006 | Pisaris-Henderson et al. |
| 2006/0197828 A1 | 9/2006 | Zeng et al. |
| 2006/0209799 A1 | 9/2006 | Gallagher et al. |
| 2006/0218604 A1 | 9/2006 | Riedl et al. |
| 2006/0230427 A1 | 10/2006 | Kunkel et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0259924 A1 | 11/2006 | Boortz et al. |
| 2006/0260601 A1 | 11/2006 | Schedeler et al. |
| 2006/0277569 A1 | 12/2006 | Smith |
| 2006/0288374 A1 | 12/2006 | Ferris et al. |
| 2006/0291506 A1 | 12/2006 | Cain |
| 2006/0294259 A1 | 12/2006 | Matefi et al. |
| 2007/0014293 A1 | 1/2007 | Filsfils et al. |
| 2007/0016476 A1 | 1/2007 | Hoffberg et al. |
| 2007/0019645 A1 | 1/2007 | Menon |
| 2007/0022459 A1 | 1/2007 | Gaebel et al. |
| 2007/0029379 A1 | 2/2007 | Peyer |
| 2007/0033531 A1 | 2/2007 | Marsh |
| 2007/0048716 A1 | 3/2007 | Hsu et al. |
| 2007/0049245 A1 | 3/2007 | Lipman |
| 2007/0061023 A1 | 3/2007 | Hoffberg et al. |
| 2007/0067851 A1 | 3/2007 | Fernando et al. |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0091920 A1 | 4/2007 | Harris et al. |
| 2007/0094691 A1 | 4/2007 | Gazdzinski |
| 2007/0094692 A1 | 4/2007 | De |
| 2007/0098350 A1 | 5/2007 | Gibbon et al. |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0118852 A1 | 5/2007 | Calderwood |
| 2007/0118910 A1 | 5/2007 | Taylor et al. |
| 2007/0121678 A1 | 5/2007 | Brooks et al. |
| 2007/0124488 A1 | 5/2007 | Baum et al. |
| 2007/0130010 A1 | 6/2007 | Pokonosky |
| 2007/0136777 A1 | 6/2007 | Hasek et al. |
| 2007/0150919 A1 | 6/2007 | Morishita |
| 2007/0157228 A1 | 7/2007 | Bayer et al. |
| 2007/0157234 A1 | 7/2007 | Walker |
| 2007/0157242 A1 | 7/2007 | Cordray et al. |
| 2007/0157262 A1 | 7/2007 | Ramaswamy et al. |
| 2007/0180230 A1 | 8/2007 | Cortez |
| 2007/0204292 A1 | 8/2007 | Riedl et al. |
| 2007/0204308 A1 | 8/2007 | Nicholas et al. |
| 2007/0204310 A1 | 8/2007 | Hua et al. |
| 2007/0209059 A1 | 9/2007 | Moore et al. |
| 2007/0217436 A1 | 9/2007 | Markley et al. |
| 2007/0219860 A1 | 9/2007 | Karls et al. |
| 2007/0219910 A1 | 9/2007 | Martinez |
| 2007/0233857 A1 | 10/2007 | Cheng et al. |
| 2007/0239536 A1 | 10/2007 | Bollapragada |
| 2007/0244760 A1 | 10/2007 | Bodnar et al. |
| 2007/0250880 A1 | 10/2007 | Hainline |
| 2007/0276925 A1 | 11/2007 | La et al. |
| 2007/0276926 A1 | 11/2007 | Lajoie et al. |
| 2007/0280298 A1 | 12/2007 | Hearn et al. |
| 2008/0016526 A1 | 1/2008 | Asmussen |
| 2008/0022012 A1 | 1/2008 | Wang |

(56) References Cited

U.S. PATENT DOCUMENTS

| | | |
|---|---|---|
| 2008/0022309 A1 | 1/2008 | Begeja et al. |
| 2008/0027801 A1 | 1/2008 | Walter et al. |
| 2008/0052157 A1 | 2/2008 | Kadambi et al. |
| 2008/0066095 A1 | 3/2008 | Reinoso |
| 2008/0066112 A1 | 3/2008 | Bailey et al. |
| 2008/0091805 A1 | 4/2008 | Malaby et al. |
| 2008/0092058 A1 | 4/2008 | Afergan et al. |
| 2008/0092181 A1 | 4/2008 | Britt |
| 2008/0098212 A1 | 4/2008 | Helms et al. |
| 2008/0109853 A1 | 5/2008 | Einarsson et al. |
| 2008/0115169 A1 | 5/2008 | Ellis et al. |
| 2008/0124056 A1 | 5/2008 | Concotelli |
| 2008/0133551 A1 | 6/2008 | Wensley et al. |
| 2008/0147497 A1 | 6/2008 | Tischer |
| 2008/0155059 A1 | 6/2008 | Hardin et al. |
| 2008/0155588 A1 | 6/2008 | Roberts et al. |
| 2008/0163305 A1 | 7/2008 | Johnson et al. |
| 2008/0168487 A1 | 7/2008 | Chow et al. |
| 2008/0170551 A1 | 7/2008 | Zaks |
| 2008/0184122 A1 | 7/2008 | Grant et al. |
| 2008/0184344 A1 | 7/2008 | Hernacki et al. |
| 2008/0189617 A1 | 8/2008 | Covell et al. |
| 2008/0192820 A1 | 8/2008 | Brooks et al. |
| 2008/0195468 A1 | 8/2008 | Malik |
| 2008/0200154 A1 | 8/2008 | Maharajh et al. |
| 2008/0201736 A1 | 8/2008 | Gordon et al. |
| 2008/0215755 A1 | 9/2008 | Farber et al. |
| 2008/0229354 A1 | 9/2008 | Morris et al. |
| 2008/0235746 A1 | 9/2008 | Peters et al. |
| 2008/0256615 A1 | 10/2008 | Schlacht et al. |
| 2008/0263578 A1 | 10/2008 | Bayer et al. |
| 2008/0271068 A1 | 10/2008 | Ou et al. |
| 2008/0271070 A1 | 10/2008 | Kanojia et al. |
| 2008/0273591 A1 | 11/2008 | Brooks et al. |
| 2008/0281697 A1 | 11/2008 | Whitehead |
| 2008/0282299 A1 | 11/2008 | Koat et al. |
| 2008/0306814 A1 | 12/2008 | Hudson |
| 2008/0306903 A1 | 12/2008 | Larson et al. |
| 2008/0307454 A1 | 12/2008 | Ahanger et al. |
| 2008/0313671 A1 | 12/2008 | Batrouny et al. |
| 2008/0313691 A1 | 12/2008 | Cholas et al. |
| 2009/0006145 A1 | 1/2009 | Duggal et al. |
| 2009/0006211 A1 | 1/2009 | Perry et al. |
| 2009/0030802 A1 | 1/2009 | Plotnick et al. |
| 2009/0031384 A1 | 1/2009 | Brooks et al. |
| 2009/0076898 A1 | 3/2009 | Wang et al. |
| 2009/0077583 A1 | 3/2009 | Sugiyama et al. |
| 2009/0083279 A1 | 3/2009 | Hasek |
| 2009/0083813 A1 | 3/2009 | Dolce et al. |
| 2009/0086643 A1 | 4/2009 | Kotrla et al. |
| 2009/0094347 A1 | 4/2009 | Ting et al. |
| 2009/0100459 A1 | 4/2009 | Riedl et al. |
| 2009/0119169 A1 | 5/2009 | Chandratillake et al. |
| 2009/0119703 A1 | 5/2009 | Piepenbrink et al. |
| 2009/0125951 A1 | 5/2009 | Agricola et al. |
| 2009/0132346 A1 | 5/2009 | Duggal et al. |
| 2009/0132347 A1 | 5/2009 | Anderson et al. |
| 2009/0133048 A1 | 5/2009 | Gibbs et al. |
| 2009/0150917 A1 | 6/2009 | Huffman et al. |
| 2009/0165045 A1 | 6/2009 | Stallings et al. |
| 2009/0171784 A1 | 7/2009 | Morgan et al. |
| 2009/0185576 A1 | 7/2009 | Kisel et al. |
| 2009/0187939 A1 | 7/2009 | Lajoie |
| 2009/0187941 A1 | 7/2009 | Smith |
| 2009/0193485 A1 | 7/2009 | Rieger et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0222316 A1 | 9/2009 | Boinepalli et al. |
| 2009/0225760 A1 | 9/2009 | Foti |
| 2009/0228941 A1 | 9/2009 | Russell et al. |
| 2009/0248794 A1 | 10/2009 | Helms et al. |
| 2009/0260030 A1 | 10/2009 | Karlsson et al. |
| 2009/0299853 A1 | 12/2009 | Jones et al. |
| 2009/0310668 A1 | 12/2009 | Sackstein et al. |
| 2009/0319379 A1 | 12/2009 | Joao |
| 2009/0320059 A1 | 12/2009 | Bolyukh |
| 2009/0327057 A1 | 12/2009 | Redlich |
| 2010/0005527 A1 | 1/2010 | Jeon |
| 2010/0023963 A1 | 1/2010 | Crookes et al. |
| 2010/0027560 A1 | 2/2010 | Yang et al. |
| 2010/0027787 A1 | 2/2010 | Benkert et al. |
| 2010/0030578 A1 | 2/2010 | Siddique et al. |
| 2010/0036720 A1 | 2/2010 | Jain et al. |
| 2010/0057560 A1 | 3/2010 | Skudlark et al. |
| 2010/0083303 A1 | 4/2010 | Redei et al. |
| 2010/0083329 A1 | 4/2010 | Joyce et al. |
| 2010/0104015 A1 | 4/2010 | Chatterjee et al. |
| 2010/0107194 A1 | 4/2010 | Mckissick et al. |
| 2010/0114696 A1 | 5/2010 | Yang |
| 2010/0115091 A1 | 5/2010 | Park et al. |
| 2010/0115540 A1 | 5/2010 | Fan et al. |
| 2010/0121936 A1 | 5/2010 | Liu et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0132003 A1 | 5/2010 | Bennett et al. |
| 2010/0146541 A1 | 6/2010 | Velazquez |
| 2010/0153831 A1 | 6/2010 | Beaton |
| 2010/0161492 A1 | 6/2010 | Harvey et al. |
| 2010/0162367 A1 | 6/2010 | Lajoie et al. |
| 2010/0169503 A1 | 7/2010 | Kollmansberger et al. |
| 2010/0175084 A1 | 7/2010 | Ellis et al. |
| 2010/0175584 A1 | 7/2010 | Kusaka et al. |
| 2010/0186029 A1 | 7/2010 | Kim et al. |
| 2010/0218231 A1 | 8/2010 | Frink et al. |
| 2010/0251304 A1 | 9/2010 | Donoghue et al. |
| 2010/0251305 A1 | 9/2010 | Kimble et al. |
| 2010/0262461 A1 | 10/2010 | Bohannon |
| 2010/0262488 A1 | 10/2010 | Harrison et al. |
| 2010/0262999 A1 | 10/2010 | Curran |
| 2010/0269131 A1 | 10/2010 | Newberry et al. |
| 2010/0269132 A1 | 10/2010 | Foti |
| 2010/0275226 A1 | 10/2010 | Kitazato |
| 2010/0280641 A1 | 11/2010 | Harkness et al. |
| 2010/0287609 A1 | 11/2010 | Gonzalez et al. |
| 2010/0293047 A1 | 11/2010 | Schwarz et al. |
| 2010/0313225 A1 | 12/2010 | Cholas et al. |
| 2010/0333132 A1 | 12/2010 | Robertson et al. |
| 2010/0333137 A1 | 12/2010 | Hamano et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0055866 A1 | 3/2011 | Piepenbrink et al. |
| 2011/0058675 A1 | 3/2011 | Brueck et al. |
| 2011/0083069 A1 | 4/2011 | Paul et al. |
| 2011/0083144 A1 | 4/2011 | Bocharov et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0110515 A1 | 5/2011 | Tidwell et al. |
| 2011/0128961 A1 | 6/2011 | Brooks et al. |
| 2011/0138064 A1 | 6/2011 | Rieger et al. |
| 2011/0154383 A1 | 6/2011 | Hao et al. |
| 2011/0178880 A1 | 7/2011 | Karaoguz et al. |
| 2011/0178943 A1 | 7/2011 | Motahari et al. |
| 2011/0223944 A1 | 9/2011 | Gosselin |
| 2011/0231265 A1 | 9/2011 | Brown et al. |
| 2011/0231660 A1 | 9/2011 | Kanungo |
| 2011/0246616 A1 | 10/2011 | Ronca et al. |
| 2011/0258049 A1 | 10/2011 | Ramer et al. |
| 2011/0264530 A1 | 10/2011 | Santangelo et al. |
| 2011/0265116 A1 | 10/2011 | Stern et al. |
| 2011/0302624 A1 | 12/2011 | Chen et al. |
| 2011/0307339 A1 | 12/2011 | Russell et al. |
| 2011/0307920 A1 | 12/2011 | Blanchard et al. |
| 2011/0317977 A1 | 12/2011 | Harris |
| 2012/0008786 A1 | 1/2012 | Cronk et al. |
| 2012/0011269 A1 | 1/2012 | Krikorian et al. |
| 2012/0030363 A1 | 2/2012 | Conrad |
| 2012/0072526 A1 | 3/2012 | Kling et al. |

(56) References Cited

U.S. PATENT DOCUMENTS

| | | |
|---|---|---|
| 2012/0076015 A1 | 3/2012 | Pfeffer |
| 2012/0079523 A1 | 3/2012 | Trimper et al. |
| 2012/0084813 A1 | 4/2012 | Dmitriev et al. |
| 2012/0089699 A1 | 4/2012 | Cholas |
| 2012/0096106 A1 | 4/2012 | Blumofe et al. |
| 2012/0110620 A1 | 5/2012 | Kilar et al. |
| 2012/0124161 A1 | 5/2012 | Tidwell et al. |
| 2012/0124606 A1 | 5/2012 | Tidwell et al. |
| 2012/0124612 A1 | 5/2012 | Adimatyam et al. |
| 2012/0137332 A1 | 5/2012 | Kumar |
| 2012/0143660 A1 | 6/2012 | Jiwang et al. |
| 2012/0144195 A1 | 6/2012 | Nair et al. |
| 2012/0151077 A1 | 6/2012 | Finster |
| 2012/0159539 A1 | 6/2012 | Berberet et al. |
| 2012/0167132 A1 | 6/2012 | Mathews et al. |
| 2012/0170544 A1 | 7/2012 | Cheng et al. |
| 2012/0170741 A1 | 7/2012 | Chen et al. |
| 2012/0173746 A1 | 7/2012 | Salinger et al. |
| 2012/0185693 A1 | 7/2012 | Chen et al. |
| 2012/0246462 A1 | 9/2012 | Moroney et al. |
| 2012/0278833 A1 | 11/2012 | Tam et al. |
| 2012/0284804 A1 | 11/2012 | Lindquist et al. |
| 2012/0308071 A1 | 12/2012 | Ramsdell et al. |
| 2012/0324552 A1 | 12/2012 | Padala et al. |
| 2013/0029716 A1 | 1/2013 | Lee et al. |
| 2013/0031578 A1 | 1/2013 | Zhu et al. |
| 2013/0041747 A1 | 2/2013 | Anderson et al. |
| 2013/0046849 A1 | 2/2013 | Wolf et al. |
| 2013/0114940 A1 | 5/2013 | Merzon et al. |
| 2013/0132986 A1 | 5/2013 | Mack et al. |
| 2013/0133010 A1 | 5/2013 | Chen |
| 2013/0166765 A1 | 6/2013 | Kaufman et al. |
| 2013/0166906 A1 | 6/2013 | Swaminathan et al. |
| 2013/0174271 A1 | 7/2013 | Handal et al. |
| 2013/0179588 A1 | 7/2013 | McCarthy et al. |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2013/0227608 A1 | 8/2013 | Evans et al. |
| 2014/0012843 A1 | 1/2014 | Soon-Shiong |
| 2014/0020017 A1 | 1/2014 | Stern et al. |
| 2014/0230003 A1 | 8/2014 | Ma et al. |
| 2014/0245341 A1 | 8/2014 | Mack et al. |
| 2014/0259182 A1 | 9/2014 | Mershon |
| 2015/0109122 A1 | 4/2015 | Stern et al. |
| 2015/0163540 A1 | 6/2015 | Masterson |
| 2016/0241617 A1 | 8/2016 | Jelley et al. |
| 2016/0335659 A1* | 11/2016 | Lewis ............... G06Q 30/0242 |

FOREIGN PATENT DOCUMENTS

| | | | |
|---|---|---|---|
| WO | WO-2010008487 A1 | 1/2010 | |
| WO | WO-2011035443 A1 | 3/2011 | |
| WO | WO-2011053858 A1 | 5/2011 | |
| WO | WO-2013026320 A1 * | 2/2013 | ........... H04L 63/145 |

OTHER PUBLICATIONS

John Rampton, 7 worthwhile ways to automate social media, 2016 (Year: 2016) (Year: 2016).*

IP-Internet Protocol, About.com, Internet Archive Capture date of Mar. 4, 2009 from URL http://compnetworking.about.com/od/networkprotocolsip/g/ip_protocol.htm.

Apple Inc., HTTP Live Streaming Overview, Apr. 1, 2011.

Deering et al., Internet Protocol, Version 6 (Ipv6) Specification, IETF RFC 2460 (Dec. 1998).

Internet Protocol DARPA Internet Program Protocol Specification, IETF RFC 791 (Sep. 1981).

Open Cable Specification entitled "Enhanced TV Binary Interchange Format 1 0" 0C-SP-ETV-131F1.0-106-110128 dated Jan. 28, 2011, 408 pages.

OpenCable Specifications, Alternate Content, Real-Time Event Signaling and Management API, OC-SP-ESAM-API-I01-120910 (2012).

SCTE American National Standard ANSI/SCTE 118-2 2007.

SCTE American National Standard ANSI/SCTE 130-1 2008.

SCTE, American National Standard, ANSI/SCTE 35 2012.

Tandberg Television specification entitled "AdPoint.RTM. Advanced Advertising Platform" dated Mar. 2008, 2 pages.

UTF-32, IBM, retrieved from http://publib.boulder.IBM.com/infocenter/iseries/v5r3/index.jsp?topic=%2Fnls%2Frbagsutf32.htm on Aug. 28, 2013.

What is Packet Switching on Computer Networks, about.com, Internet Archive Capture date of Feb. 12, 2009 from URL http://compnetworking.about.com/od/networkprotcols/f/packet-switch.htm.

Zarnbelli, The Apparatus and Methods of HS Smooth Streaming Technical Overview, Mar. 2009.

* cited by examiner

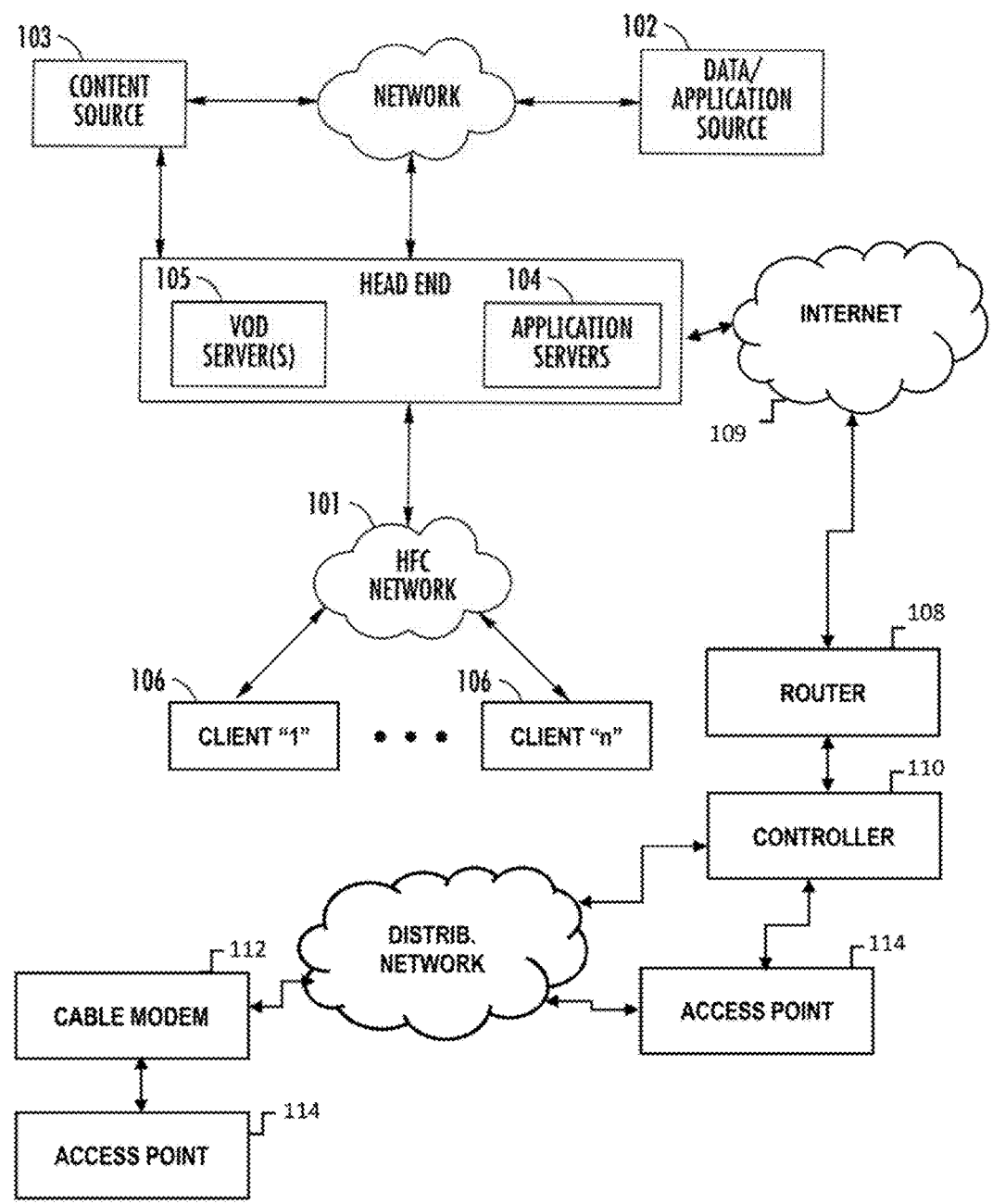

| NETWORK | TOP10 | 664 RLDU | 668 RLFY | 1028 RLSP | 9527 RIJW | 9528 RLWN | 9529 RLWS |
|---|---|---|---|---|---|---|---|
| AMC | | | | | | | |
| APL | | ✓ | | | | | |
| BET | | | | ✓ | | ✓ | |
| CMDY | | | | | ✓ | ✓ | ✓ |
| DISC | | | | ✓ | ✓ | ✓ | ✓ |
| ESP2 | | | | | ✓ | ✓ | ✓ |
| FAM | | | ✓ | ✓ | ✓ | ✓ | ✓ |
| FX | | | ✓ | ✓ | | ✓ | ✓ |
| GOLF | | | ✓ | ✓ | | | |
| HALL | | ✓ | | | | | |
| HLN | | ✓ | | | | | |
| LIF | | | ✓ | ✓ | ✓ | ✓ | ✓ |
| LMN | | ✓ | | | ✓ | ✓ | ✓ |
| MTV | | ✓ | | | ✓ | ✓ | ✓ |
| NBCS | | | ✓ | ✓ | | | |
| NICK | | | ✓ | | | | |
| SPK | | | ✓ | ✓ | | | |
| SYFY | | ✓ | | | ✓ | ✓ | ✓ |
| TLC | | ✓ | ✓ | ✓ | ✓ | ✓ | ✓ |
| TOON | | ✓ | | | | | |
| TRU | | ✓ | | | | | |
| TWC | | | ✓ | ✓ | | | |
| TWNE | | ✓ | ✓ | ✓ | ✓ | ✓ | ✓ |
| BRVO | YES | ✓ | | | | | |
| ESPN | YES | ✓ | ✓ | ✓ | ✓ | ✓ | ✓ |
| FOOD | YES | ✓ | ✓ | ✓ | ✓ | ✓ | ✓ |
| HGTV | YES | ✓ | ✓ | ✓ | ✓ | ✓ | ✓ |
| HIST | YES | ✓ | ✓ | ✓ | | | |
| TBSC | YES | ✓ | ✓ | ✓ | ✓ | ✓ | ✓ |
| TNT | YES | ✓ | ✓ | ✓ | ✓ | ✓ | ✓ |
| USA | YES | ✓ | ✓ | ✓ | ✓ | ✓ | ✓ |

FIG. 4B

EXEMPLARY PRICING OPTIONS

RATE CARD

| COST | CPM | AUR |
|---|---|---|
| $1,389 | $21.36 | $17.36 |

BLENDED RATE

| COST | CPM | AUR |
|---|---|---|
| $587 | $9.03 | $7.34 |

EFFECTIVE RATE

| COST | CPM | AUR |
|---|---|---|
| $336 | $5.17 | $4.21 |

CPM = COST PER MILE (COST PER THOUSAND IMPRESSIONS)

| 40% REACH TARGET | | |
|---|---|---|
| INVENTORY TYPE | SPOTS | IMPRESSIONS |
| 1 PRIME - TOP TEN NETS | 6 | 4,182 |
| 2 PRIME - OTHER NETS | 22 | 20,787 |
| 3 DAY - TOP TEN NETS | 10 | 3,027 |
| 4 DAY - OTHER NETS | 42 | 37,026 |
| TOTAL | 80 | 65,022 |

FIG. 4F

APPARATUS AND METHODS FOR AUTOMATED SECONDARY CONTENT MANAGEMENT IN A DIGITAL NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content data delivery over a network. More particularly, the present disclosure is related in one exemplary aspect to apparatus and methods for secondary content (e.g., advertising, promotions, etc.) management and provision within a managed content distribution network such as a cable, satellite, or hybrid fiber/copper (HFCu) distribution network.

2. Description of Related Technology

In the context of network services, it is often highly desirable to provide users of the network with ready and instant access to a variety of different types of content (e.g., linear or broadcast content, video-on-demand (VOD), "start-over", streaming media, etc.), accessible at different locations, and on different platforms (e.g., via set-top box, smart-TV, tablet or smartphone, etc.). In many cases, it is also desirable to provide the same users with "secondary" content (such as e.g., advertisements, promotions or "infomercials", related shorts, telescoping information/advertisements, hyperlinks, etc.). The secondary content may be directly or indirectly related to the "primary" content which the user selected in the first place (such as via a common theme or context, common persons of interest, common demographic factors, etc.), or can be totally unrelated.

Delivery of secondary content may comprise a major source of revenue for commercial television or movie distributors, and for the network operator. For example, where the secondary content comprises advertisements, it may be a main source of income for national television broadcasters and their local over-the-air affiliates. Cable, satellite, HFCu, and other content distribution networks, as well as Internet content providers, also derive income from the sale of advertising time and insertion opportunities (and "impressions" associated therewith).

Moreover, an advertiser may seek to maximize the return on their advertising investment by targeting specific users or groups of users that are likely to be most receptive to the commercial message embodied in the advertisements. The aforementioned selective "targeting" and delivery of content to e.g., subscribers in a cable network is generally well known in the prior art. For example, it may be desirable to include certain types of advertising at specific demographic or geographic segments of an MSO's subscriber base. One way of targeting viewers involves selecting advertisements based on a geographical region in which the advertisement is to be delivered; i.e., a so-called "advertisement zone". In other words, it is advantageous to provide certain advertising content to viewers in one local or regional area which is different than that provided to the viewers in a different local or regional area.

For example, the advertisements may be limited by the geographic area in which a business operates. Hence, it typically only makes financial sense for an advertisement for that business to be provided in geographical areas where the business is operated or provides services. Similar logic applies to the demographic, psychographic, and other planes; e.g., an advertisement for a super-high end sports car would likely be wasted when delivered to lower middle-class households or subscribers (which may or may not be correlated to geography), as would an advertisement for a feminine product delivered to a predominantly male audience. Additionally, the context of the primary content may not be compatible with particular types/themes of secondary content (e.g., a VOD movie having a non-violent theme might not mesh optimally with advertisements for UFC sporting or boxing events, regardless of demographics or geography).

Hence, as used herein, the term "advertising zone" may include the delivery of advertisements, promotions, or other secondary content with an actual geographic zone, a demographic "zone" or logical space, a psychographic zone or logical space, a user-based preference space, a primary/secondary content context space, and so forth.

One technique for advertising comprises use of so-called "audience bundles". Typically, such audience bundles are built to reach a certain demographic group. Audience bundles are useful when a client (e.g., advertiser) has a defined demographic or other target, and wants assurance that their audience is being reached with a certain level of frequency.

One problem commonly encountered in the foregoing scenarios relates to managing the great complexity of secondary content insertion opportunities. For example, a typical cable MSO may have a very large number of local "networks" (i.e., content provider networks or "channels") ranging from small, geographically localized networks (e.g., KUSI-TV, a San Diego, Calif. independent station) to larger, regional networks, to national- or even global-level networks such as CBS, ABC, etc. Each of these content networks provides varied programming, including a number of secondary content "spots" interspersed throughout the programming day. For instance, on average, a given content network may have two (2) minutes of available advertising spots (aggregate) per hour of programming, such as four (4) 30-second spots per hour. Considering that the MSO may carry, via its content distribution infrastructure, literally dozens of such content networks/channels, this equates to roughly 24 hours×4 spots=96 available spots for each channel per day, and hence perhaps as many as thousands of different available spots in total for a given day. As can be appreciated, this becomes exceedingly difficult to manage manually, even at a basic level (i.e., without delving into the different demographics/psychographics, geographics, user profiles, etc. of the viewers of these channels, and how a given prospective advertiser's products and/or services may correlate or "map onto" such information).

Adding further complexity are such factors as: (i) a given advertiser's potential desire to be associated with particular primary content (e.g., they want to be within or temporally proximate to Monday Night Football since their target demographic is sports-minded people); (ii) the desire to know in advance what sort of penetration or efficacy a given schedule or campaign of advertising might produce; and (iii) financial limitations of prospective advertisers on implementing a given schedule or campaign. These factors are, under prior art approaches, typically addressed through heuristics or generalizations; e.g., in the context of item (i) above, it is assumed that sports-minded people will be a large portion of the audience for Monday Night Football, but such assumptions may be inaccurate to varying degrees, and lack the ability to be tested under e.g., a sensitivity or other analysis (for instance, as the time slot during the aforementioned event for a given advertisement is shifted outside of the event, what result such shift has on impressions by the target population of sports-minded people), or validated using e.g., historical or other data.

Yet further, the broad variety of different delivery paradigms and target platforms further complicates management of such activities. As indicated above, the typical MSO network includes both linear (e.g., broadcast, and non-repeatable) content, as well as non-linear content such as streaming IP-based content, VoD, cDVR, start-over, and the like, each of which raise their own issues. For example, does a given content program (e.g., Breaking Bad episode) when originally transmitted at say 5:00 pm local time require the same or different advertising when transmitted (or re-transmitted) at say midnight local, or days or even weeks later? What if certain advertising is not optimized or available for delivery or display on the smartphone or tablet via which the user is requesting it?

Moreover, it is critical for the MSO or other service provider to know (or at least be able to reliably estimate) what its prospective profit and/or revenue from implementing a given schedule or campaign are—the MSO/service provider clearly wants to optimize the financial aspects of providing such services (while also optimizing advertiser utility/satisfaction, as well as providing is subscribers with secondary content that is useful and germane to their particular context).

There is also a potentially large and untapped customer base for the MSO; i.e., relatively unsophisticated, and lower-budget advertisers who, by virtue of lacking explicit knowledge of advertising schedules, market correlations, and the like (i.e., they may know their target audience, but not the specifics of how to reach them), and through limited capital to expend on an advertising campaign, are larger excluded from the market. As in many endeavors, some level of detailed knowledge of the inner workings and considerations associated with multi-channel advertising is required under the prior art, and many of the more unsophisticated potential customers either rely on MSO personnel expertise (which has its own set of disabilities, including costs and latencies associated with human-centric management and implementation), or are dissuaded from any participation.

Heretofore, no suitable mechanism has existed which enables each of a) substantially automated, dynamic analysis and management of the large number of available spots across many different content networks (channels) over a designated period; b) substantially accurate projection of the penetration, impressions, or other performance attributes of a proposed schedule before the customer (e.g., advertiser) selects or implements it; c) substantially accurate correlation between the desired result (e.g., performance which the customer seeks) and that customer's budget; d) substantially accurate projection of the financial or other implications of the proposed schedule or campaign for the MSO or other service provider; e) scaling from relatively small schedules/campaigns to larger ones, including intra-/inter-regionally; and f) coordination with other schedules or campaigns implemented by other MSO customers (e.g., other advertisers) so as to, inter alia, optimize MSO coverage and financial performance.

Prior art approaches have historically managed such activities using, e.g., more general-purpose tools such as database software, manual user data entry and analysis, and the like; yet such tools have proven inadequate, especially in light of the complexities and considerations discussed supra.

SUMMARY

The present disclosure addresses the foregoing needs by disclosing, inter alia, apparatus and methods for managing secondary content schedules and campaigns within a content distribution network infrastructure. In one aspect of the disclosure, a computerized method of constructing secondary content bundles for use in a content distribution network is described. In one embodiment, the method includes: determining a plurality of secondary content insertion opportunities within a plurality of different content networks; based at least on the determined plurality of secondary content insertion opportunities, selecting a subset of the plurality of different content networks; based at least on the selected subset, running a plurality of first computerized simulations to determine one or more optimal insertion opportunity counts to achieve one or more specified target performance criteria; and validating the determined one or more optimal insertion opportunity counts using one or more second computerized simulations that are based on data different than that used for the first simulations.

In one variant, the determination of a plurality of secondary content insertion opportunities within a plurality of different content networks is based at least on allocation of the insertion opportunities across: (i) a plurality of different content networks based on tier; and (ii) a plurality of different dayparts. Such allocation of the insertion opportunities across plurality of different content networks based on tier may, for instance, include allocation across a first tier comprising a prescribed percentage of top-ten popularity content networks, and allocation across a second tier comprising a prescribed percentage of non-top ten popularity content networks. The allocation of the insertion opportunities across plurality of different content networks based on a plurality of different dayparts can include for example allocation across a prime-time daypart and allocation across one or more non-prime time dayparts. In another variant of the method, the selection of a subset of the plurality of different content networks comprises selecting based at least on a ranking of each of the plurality of content networks by at least one of reach and/or sellout rate.

In one implementation, the selection of a subset of the plurality of different content networks comprises eliminating one or more of the plurality of content networks based on a content context associated with each of the one or more networks.

In another variant of the method, the validation using one or more second computerized simulations that are based on data different than that used for the first simulations comprises running a plurality of second computerized simulations based at least on historical network user tuning data associated with a time period different than an associated time period for historical network user tuning data used for the first simulations. In one implementation, the validation comprises achieving, using the second simulations, at least a prescribed level performance relative to the one or more specified target performance criteria, such as e.g., (i) a reach target, and (ii) a frequency target.

In another aspect, a computer readable apparatus comprising a non-transitory storage medium is disclosed. In one embodiment, the non-transitory medium includes at least one computer program having a plurality of instructions, the instructions configured to, when executed on a processing apparatus: obtain first data, at least portion of the first data relating to available advertising inventory on a plurality of different content networks; obtain second data relating to historical tuning activity of one or more users of a service provider network; obtain rate structure data associated with the advertising inventory; determine one or more desired performance criteria for an advertising campaign to be conducted over at least some of the plurality of different content networks; evaluate one or more performance attributes of selected ones of the plurality of content networks based on at least the second data; and, based at least on the obtained first and second data, the rate structure data, the evaluated performance, and one or more performance criteria, calculate a number of individual advertising spots necessary to achieve the one or more desired performance criteria.

In one variant, the one or more desired criteria, and the one or more performance criteria, each comprise both (i) reach, and (ii) frequency.

In another variant, the calculation of the number of spots comprises performing a plurality of computerized simulations based at least on the obtained first and second data, rate structure data, evaluated performance, and one or more performance criteria.

In a further variant, the plurality of instructions are further configured to, when executed: generate a schedule of the individual advertising spots across at least a portion of plurality of content networks, the schedule configured to achieve the desired performance criteria; and apply a multi-modal pricing structure to the generated schedule.

In a further aspect of the disclosure, a computerized method of generating a secondary content schedule is described. In one embodiment, the schedule is configured to achieve one or more performance targets and is utilized within a managed content distribution network having a plurality of subscribers, and the method includes: selecting a date range and a target market for analysis; obtaining one or more standardized descriptions associated with the selected target market; obtaining inventory data, the data indicating available secondary content insertion opportunities associated with a plurality of content networks for the date range; specifying one or more variables to be used for the analysis; excluding one or more networks based on one or more exclusion criteria; determine a number of the subscribers associated with the selected market; obtain viewership data for non-excluded ones of the plurality of content networks; ranking the non-excluded ones of the plurality of content networks based at least on one or more performance metrics; obtaining rate data associated with the inventory; selecting instances of secondary content for a prescribed period; randomizing and ranking the selected secondary content instances; determining a quantity of the selected secondary content instances based at least on the specified one or more variables; obtain historical subscriber viewership data for a duration equal to the prescribed period; evaluate the historical subscriber viewership data for performance; based at least on the evaluation, determine a minimum number of secondary content instances that meet the one or more performance targets; produce a schedule of secondary content instances that includes the determined minimum number of instances; and assign pricing to the determined schedule.

In one variant, the one or more standardized descriptions associated with the selected target market comprise system codes, and the one or more variables to be used for the analysis comprise: (1) a percentage of spots per content network tier; (2) a percentage of spots per daypart and (3) a range of a number of spots to be evaluated.

In another variant, the inventory data comprises: (1) a listing of a plurality of content networks having available insertion opportunities; and (2) a percentage of the available insertion opportunities sold, on both a per-content network and a per-tier basis.

In a further aspect of the disclosure, computerized network apparatus is disclosed. In one embodiment, the apparatus is configured for substantially automated calculation of a secondary content schedule for use by one or more customers of a managed content distribution network operator, and includes: a plurality of client application computer programs operative to run on respective remote client devices and communicate respective sets of specifications for respective secondary content campaigns desired by respective ones of customers of the network operator; and server apparatus.

In one variant, the server apparatus includes: processor apparatus; network interface apparatus in data communication with the processor apparatus; and storage apparatus in data communication with the processor apparatus, the storage apparatus comprising at least one computer program. In one implementation, the at least one computer program is configured to, when executed on the processor apparatus: receive, via the network interface apparatus, the plurality of respective sets of specifications from the client application computer programs; for each received respective set of specifications, access one or more pre-existing computerized models, the one or more models comprising simulation-based projections for each of a plurality of performance metrics associated with secondary content campaigns, and select the appropriate one or more models to utilize consistent with the respective set of specifications.

In another implementation, the respective sets of specifications comprise desired performance with respect to campaign reach, and the simulation-based projections comprise a plurality of simulations that are based on different ones of historical tuning data associated with a plurality of subscribers of the managed content distribution network.

In another aspect of the disclosure, a computerized analytics "engine" is disclosed. In one embodiment, the engine comprises a plurality of computer algorithms operative to run on a computerized platform (e.g., server or server farm) and configured to simulate various secondary content (e.g., advertising) schedules or campaigns, and enable determination of, inter alia, a prescribed number of spots on a plurality of networks necessary to achieve a desired target value.

In a further aspect, a data architecture and corresponding database is disclosed.

In yet another aspect of the disclosure, a method of substantially automatically generating advertising campaign aggregations or "bundles" is disclosed.

In a further aspect, a network architecture for use within a managed content distribution network is disclosed.

In another aspect of the disclosure, a method of operating a service provider network is disclosed. In one embodiment, the method includes determining a plurality of secondary content insertion opportunities within a plurality of different content networks; based at least on the determined plurality of secondary content insertion opportunities, selecting a subset of the plurality of different content networks; based at least on the selected subset, running a plurality of first computerized simulations to determine one or more optimal insertion opportunity counts to achieve one or more specified target performance criteria; validating the determined one or more optimal insertion opportunity counts using one or more second computerized simulations that are based on data different than that used for the first simulations; and delivering at least one of the optimal counts of secondary content via the selected subset of networks.

These and other aspects of the disclosure shall become apparent when considered in light of the detailed description provided herein.

BRIEF DESCRIPTION OF THE DRAWINGS

FIG. 1 is a functional block diagram illustrating an exemplary hybrid fiber/coax (HFC) cable network configuration useful with the present disclosure.

FIG. 4b is a graphical representation of one embodiment of a tabular data structure relating various content networks and system codes (Syscodes) useful with the methodology of FIG. 4.

FIG. 4f is a graphical representation of an exemplary multi-model pricing scheme for advertising "bundles" generated by the computerized system of the present disclosure.

Figure 1A:
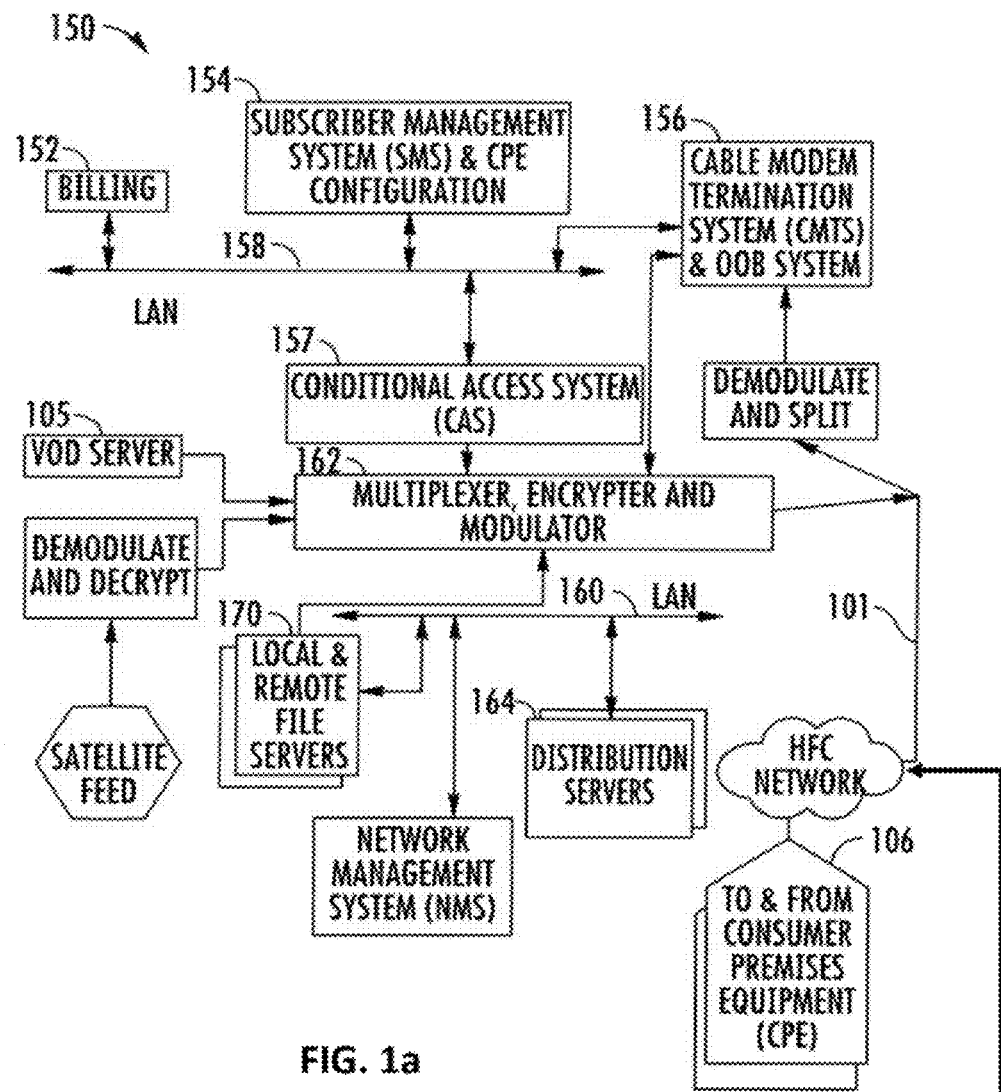
FIG. 1a is a functional block diagram illustrating one exemplary HFC cable network headend configuration useful with the present disclosure.
Figure 1A:
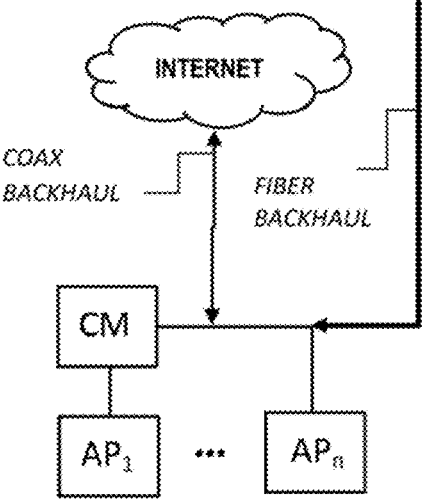
Figure 1B:
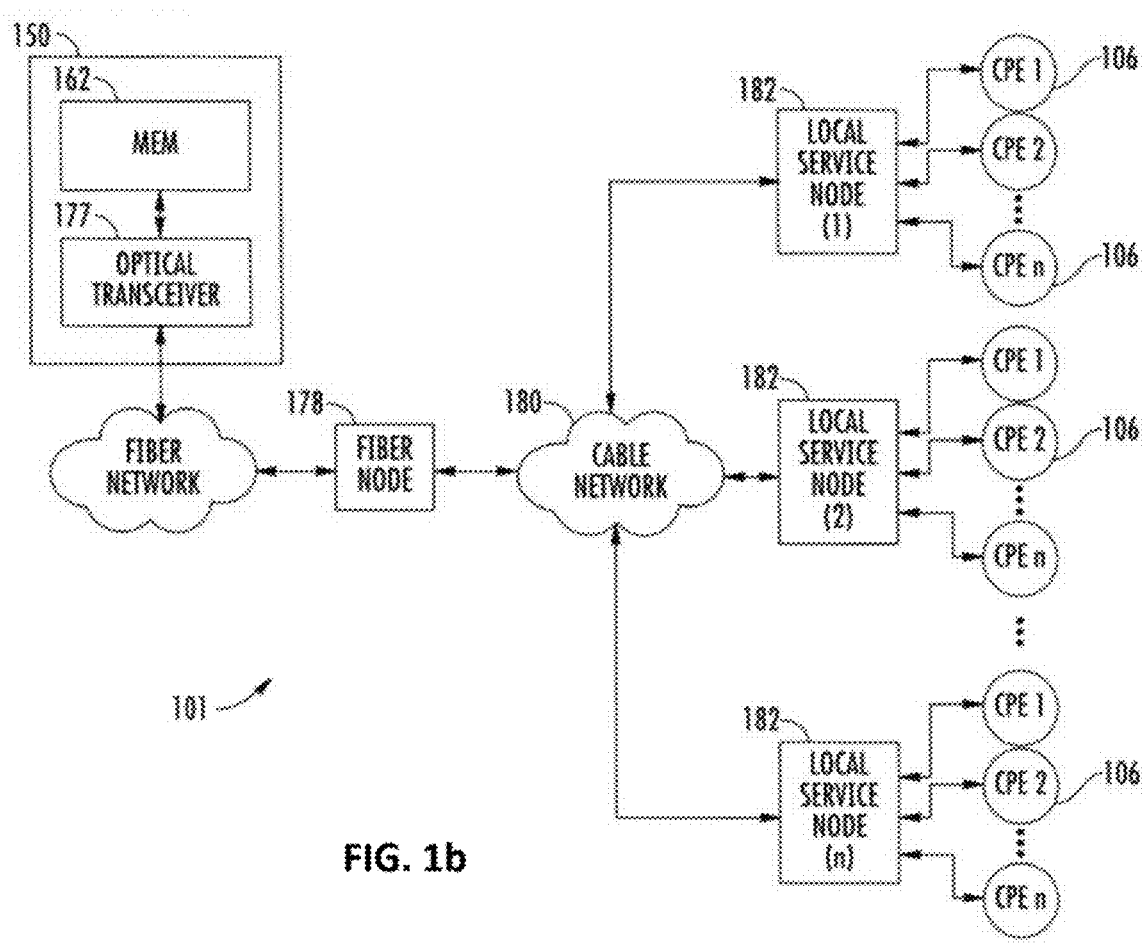
FIG. 1b is a functional block diagram illustrating one exemplary local service node configuration useful with the present disclosure.

All figures © Copyright 2016 Time Warner Cable Enterprises LLC. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, digital set-top boxes (e.g., DSTBs), personal computers (PCs), and minicomputers, whether desktop, laptop, or otherwise, and mobile devices such as handheld computers, tablets, phablets, personal digital assistants (PDAs), personal media devices (PMDs), and smartphones.

As used herein, the term "computer program" or "software" is meant to include any sequence or human or machine cognizable steps which perform a function. Such program may be rendered in virtually any programming language or environment including, for example, Python, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), C #, and the like.

The terms "consumer premises equipment" (CPE) and "consumer device" refer without limitation to any type of electronic equipment for use within a consumer's or user's premises and connected to a content distribution network. The term "consumer device" includes terminal devices that have access to digital television content via a satellite, cable, or terrestrial network. The term "consumer premises equipment" (CPE) includes such electronic equipment such as set-top boxes (e.g., DSTBs or IPTV devices), televisions, cable modems (CMs), embedded multimedia terminal adapters (eMTAs), whether stand-alone or integrated with other devices, digital video recorders (DVR), gateway storage devices, and ITV personal computers.

As used herein, the term "database" refers generally to one or more tangible or virtual data storage locations, which may or may not be physically co-located with each other or other system components.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose complex instruction set computing (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the term "network content provider" refers generally and without limitation to any content service provider or content-providing logical "network" such as e.g., ABC, NBC, CBS, etc., regardless of delivery platform or underlying content distribution network infrastructure (see below).

As used herein, the terms "network" and "bearer network" (distinguished from "network content provider" supra) refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., LTE/LTE-A, 3GPP, 3GPP2, UMTS), or IrDA families.

As used herein, the terms "personal media device" and "PMD" refer to, without limitation, any device, whether portable or otherwise, capable of storing and/or rendering media.

As used herein, the term "secondary content" refers without limitation to content other than primary programming content, such as e.g., advertisements, promotions, "telescoping" content, info-mercials, trailers, icons or animated overlays, etc. which may be presented either alone or in conjunction with the primary (or yet other) content.

As used herein, the term "server" refers to, without limitation, any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/s/v/ac or 802.11-2012, as well as so-called "Wi-Fi Direct", each of the foregoing incorporated herein by reference in its entirety.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee, RFID/NFC, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, the present disclosure provides apparatus and methods for substantially automatically generating advertising scheduling and product (e.g., "bundle") offerings for users of a managed content distribution network such as a cable, satellite, of HFCu network.

In one exemplary embodiment, the methods an apparatus disclosed herein leverage both a variety of available data sources, including available secondary content inventory (e.g., available advertising "slots" across a plurality of different content networks or channels), and indigenously developed data relating to behavior of individual network subscribers (or larger subsets of the subscriber population), as well as computer-based simulations and models to, inter alia, identify product offerings that will apply to desired numbers and/or segments of the network operator's subscribers and achieve their particular goals, and within certain budgetary prescribed frameworks or rules specified by the network operator's advertising customers.

This capability enables timely generation and implementation of customer-instituted advertising management plans and schedules (based on, e.g., a derived "spot count", and built around a prescribed period such as a broadcast month), including for a multitude of customers of the network simultaneously, thereby providing a heretofore unavailable operational capability and profitability (analysis) for the network operator, while reducing the need for manual (i.e., human) input, and its associated overhead and latency. The network operator can therefore offer largely preconfigured or "off the shelf" advertising products to its customers (as well as more sophisticated, customized products) in a highly automated fashion, and which have a broad reach.

Such methods and apparatus also enable a relatively unsophisticated advertising customer of the network operator to specify their desired result in high-level terms, consistent with their budget, while obviating the need for such customer to have any in-depth knowledge of their intended consumers of their products/services, or how to reach them (e.g., which programs they watch, etc.).

Moreover, the foregoing analysis and correlation can be used as the basis for "products" that can be provided to other network operators, service providers, or entities (whether free or for consideration), including third party advertisers, irrespective of whether they actually purchase any particular bundle.

Detailed Description of Exemplary Embodiments

Exemplary embodiments of the apparatus and methods of the present disclosure are now described in detail. While these exemplary embodiments are described in the context of a managed content distribution network (e.g., hybrid fiber coax (HFC) cable) architecture having a multiple systems operator, digital networking capability, and plurality of client devices/CPE, and Internet delivery via e.g., RF QAM and DOCSIS cable modem, the general principles and advantages of the disclosure may be extended to other types of networks, architectures and applications, whether broadband, narrowband, wired or wireless, terrestrial or satellite, managed or unmanaged (or combinations thereof), or otherwise, the following therefore being merely exemplary in nature.

It will also be appreciated that while described generally in the context of a network providing service to a customer or consumer or end user (i.e., residential), the present disclosure may be readily adapted to other types of environments including, e.g., commercial/retail, or enterprise domain (e.g., businesses), and government/military applications. Myriad other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (Ipv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure, including improvements to computerized technology, will immediately be recognized by persons of ordinary skill in the art with reference to the attached drawings and detailed description of exemplary embodiments as given below.

It will also be recognized that while described primarily in the context of one or more relational databases, the various aspects of the disclosure may be implemented using other types or constructs of databases, whether alone or in combination with a relational database.

Managed Service Provider Network

FIG. 1 illustrates a typical service provider network configuration useful with the features of the automated secondary content management system described herein. The various components of the exemplary embodiment of the network 100 include (i) one or more data and application origination sources 102; (ii) one or more content sources 103, (iii) one or more application distribution servers 104; (iv) one or more VOD servers 105, (v) client devices and/or Customer Premises Equipment (CPE) 106, (vi) one or more routers 108, (vii) one or more wireless access point controllers 110 (may be placed more locally as shown or in the headend or core" portion of network), (viii) one or more cable modems 112, and/or (ix) one or more access points 114. The distribution server(s) 104, VOD servers 105 and CPE/client device(s) 106 are connected via a bearer (e.g., HFC) network 101. A simple architecture comprising one of each of certain components 102, 103, 104, 105, 108, 110 is shown in FIG. 1 for simplicity, although it will be recognized that comparable architectures with multiple origination sources, distribution servers, VOD servers, controllers, and/or client devices (as well as different network topologies) may be utilized consistent with the present disclosure. For example, the headend architecture of FIG. 1a (described in greater detail below), or others, may be used.

FIG. 1a shows one exemplary embodiment of a headend architecture. As shown in FIG. 1a, the headend architecture 150 comprises typical headend components and services including billing module 152, subscriber management system (SMS) and client/CPE configuration management module 154, cable modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Moreover, the functions described below with respect to FIGS. 2-4g can be (i) co-located at one or more centralized locations within the network (e.g., at one or more headends), (i) distributed throughout various disparate locations of the MSO-managed network; or (iii) distributed at various locations within and external to the MSO-managed network (e.g., use assets, sources, etc. which are maintained by one or more third party data sources or providers).

The exemplary architecture 150 of FIG. 1a further includes a conditional access system (CAS) 157 and a multiplexer-encrypter-modulator (MEM) 162 coupled to the HFC network 101 adapted to process or condition content (including e.g., secondary content such as advertisements) for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices/CPE 106 ("downstream") are multiplexed together in the headend, as previously described and sent to neighborhood hubs (as shown in the exemplary scheme of FIG. 1b) via a variety of interposed network components.

Content (e.g., audio, video, data, files, etc.) is provided in each downstream (in-band) channel associated with the relevant service group. To communicate with the headend or intermediary node (e.g., hub server), the client devices/CPE 106 may use the out-of-band (OOB) or DOCSIS channels and associated protocols. The OCAP 1.0, 2.0, 3.0, 3.1 (and subsequent) specification provides for exemplary networking protocols both downstream and upstream, although the present disclosure is in no way limited to these approaches.

Figure 1C:
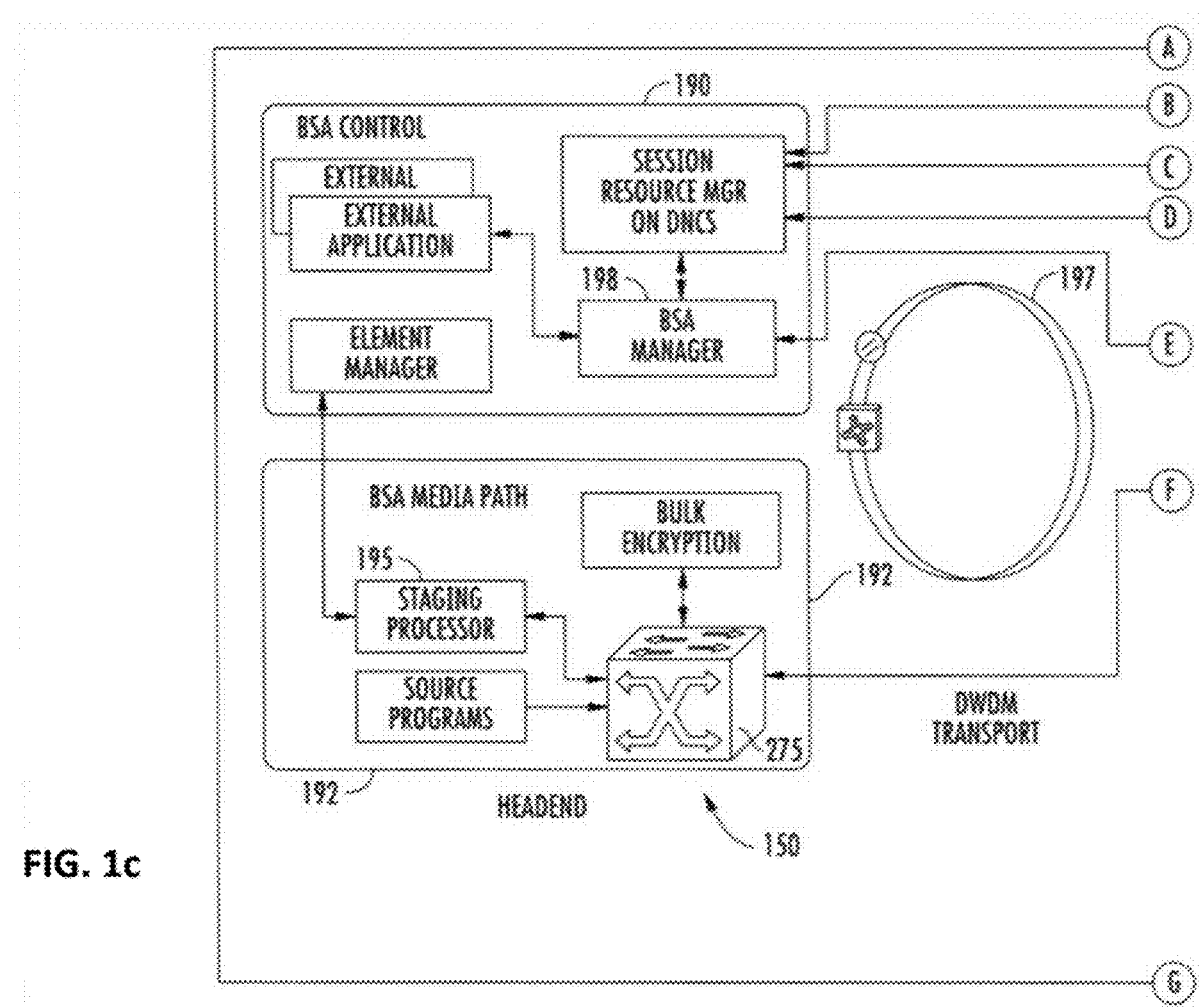
FIG. 1c is a functional block diagram illustrating one exemplary broadcast switched network architecture useful with the present disclosure.
Figure 1C:
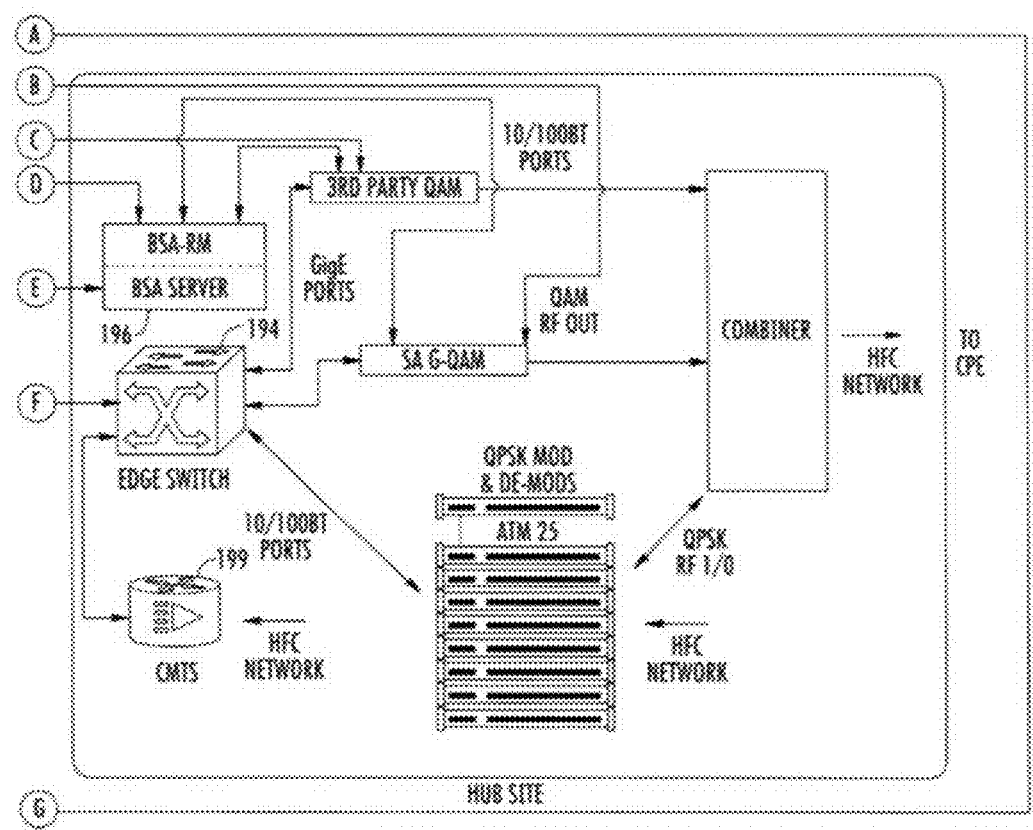

FIG. 1c illustrates an exemplary "switched" network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. Broadcast switched architecture (BSA) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user client devices (including IP-based STBs or IP-enabled consumer devices) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's client device or other IP-enabled device via the user's cable modem. Delivery in such packetized modes may be unicast, multicast, or broadcast.

Referring again to FIG. 1c, the IP packets associated with Internet services are received by the edge switch 194, and in one embodiment forwarded to the cable modem termination system (CMTS) 199. The CMTS examines the packets, and forwards packets intended for the local network to the edge switch 194. Other packets are discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

The edge switch 194 forwards the packets received from the CMTS 199 to the QAM modulator, which transmits the packets on one or more physical (QAM-modulated RF) channels to the CPE/client devices. The IP packets are typically transmitted on RF channels (e.g., DOCSIS QAMs) that are different that the RF channels used for the broadcast video and audio programming, although this is not a requirement. The client devices/CPE 106 are each configured to monitor the particular assigned RF channel (such as via a port or socket ID/address, or other such mechanism) for IP packets intended for the subscriber premises/address that they serve. For example, in one embodiment, a business customer premises obtains its Internet access (such as for a connected Wi-Fi AP) via a DOCSIS cable modem or other device capable of utilizing the cable "drop" to the premises (e.g., a premises gateway, etc.).

Figure 1D:
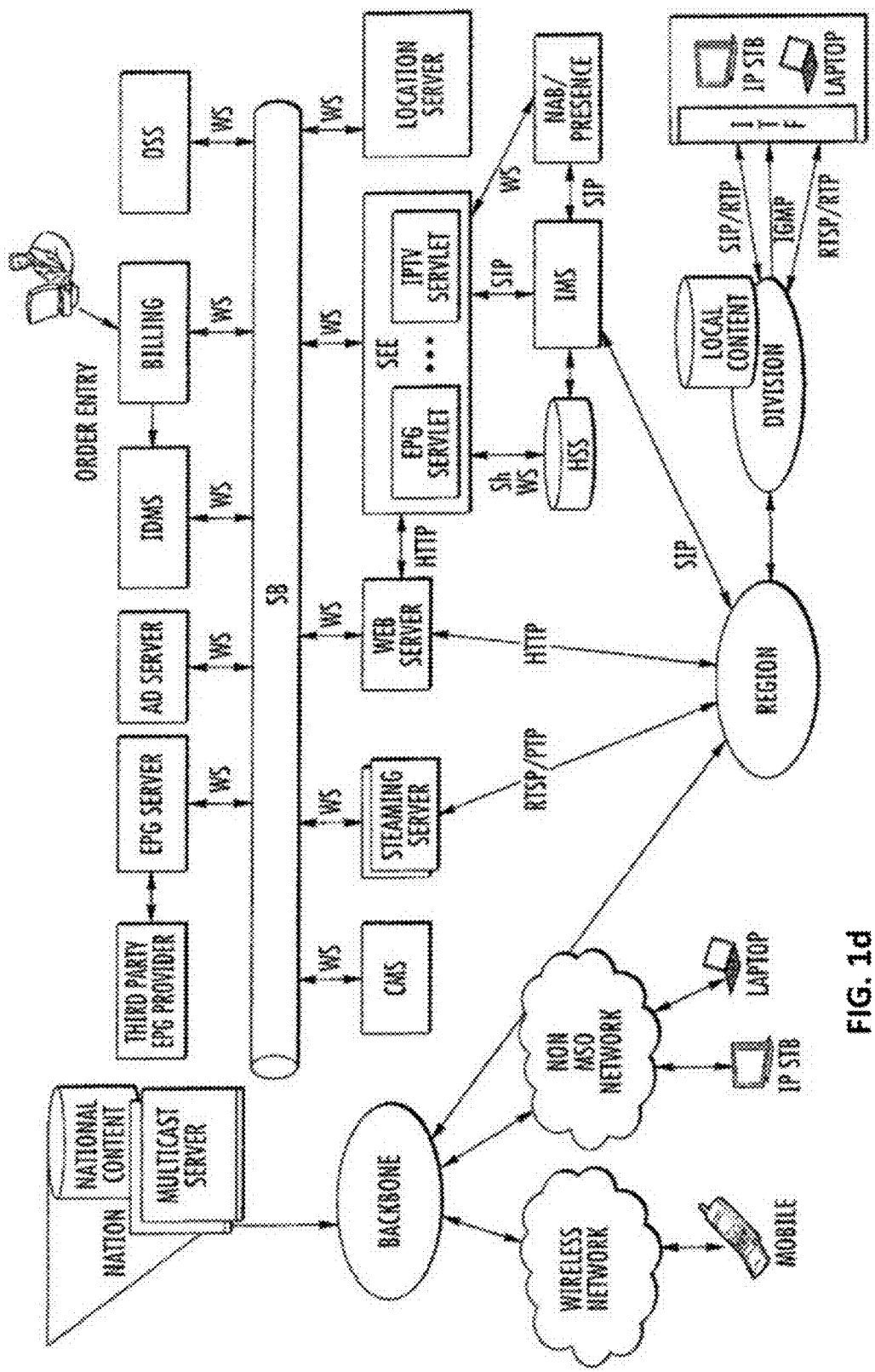
FIG. 1d is a functional block diagram illustrating one exemplary packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., Internet data, IPTV content, etc.). FIG. 1d illustrates one exemplary implementation of such a network, in the context of a 3GPP IMS (IP Multimedia Subsystem) network with common control plane and service delivery platform (SDP), as described in co-owned U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title, and issued as U.S. Pat. No. 10,264,029 on Apr. 16, 2019, incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

In another embodiment, the methods and apparatus disclosed in U.S. Pat. No. 8,701,138 issued Apr. 15, 2014 and entitled "ZONE CONTROL METHODS AND APPARATUS", which is incorporated herein by reference in its entirety, may be used consistent with the present disclosure. Specifically, the aforementioned patent discloses, inter alia, methods and apparatus for selectively providing targeted secondary content to a user based at least in part on a logical, geographic, or other "zone" or space associated with the user. In one embodiment, when the user requests primary content at a non-legacy device (e.g., an IP-capable device such as an IP-enabled DSTB, portable computer, or 4G smartphone), the secondary content that is provided therewith is the same secondary content which would have been provided to the user had the request been generated at a legacy device; i.e., the "zone" (whether geographic, demographic, psychographic, or otherwise) is preserved. In one implementation, a non-legacy device is associated with a user's zone by introducing a link between a server providing content to the device (e.g., a web server) and a server which has the ability to determine an appropriate zone for the user. This is accomplished for example by associating each user with an advertisement zone identifier. Alternatively, the foregoing may be accomplished by associating each user with a device that is associated with a physical hub or node identifier, which, in turn, is associated with an advertisement zone identifier. In yet another variant, a service group identifier (rather than advertisement zone identifier) may be used.

Hence, using such methods and apparatus, the "reach" of a given advertising schedule (and its associated particular spots) generated using the methodology herein that is based on data derived from legacy CPE can be preserved for non-legacy, mobile devices.

It will also be appreciated that the methods and apparatus described herein can be readily adapted for use with non-linear delivery paradigms such as e.g., VOD (video on demand). In one such variant, non-linear content-related events can be modeled according to a statistical or other scheme, such as based on historical activity (e.g., historical data indicating that in a given zone, there are certain frequencies and/or temporal distributions of activities such as VOD request, Start-Over requests, IP-based streaming sessions, etc.), and such information used as part of the aforementioned "inventory" of insertion opportunities, In one implementation, the non-linear content (e.g., VOD movie or TV episode) is characterized, whether by the MSO or an upstream content source or processing entity, as to one or more themes or logical threads associated with the content. For example, an animated movie about pets could be categorized in terms of themes relating to (i) animals generally; (ii) dogs and/or cats specifically; and (iii) humane societies (e.g., SPCA), was well as others. Such theme characterizations (e.g., in the form of alphanumeric codes or the like) can be used to correlate the movie with one or more networks/content channels (e.g., Animal Planet), the latter which also has associated insertion opportunities. Hence, advertisements targeted at the network/content channel would also presumably have at least some applicability to requesters of the non-linear content. In one methodology, one or more insertion opportunities associated with the non-linear content (e.g., at onset, such as when VOD session is queueing up the requested content for delivery, at a pre-planned intermediate break within the movie, at the end of the movie, or as part of a telescoping function associated with the movie) are identified, whether before delivery or "on the fly" during delivery, and the theme identifiers are accessed and correlated to an extant network/content channel campaign or bundle, and one or more secondary content elements drawn from the latter for insertion into the non-linear opportunities based on e.g., fitting within a prescribed temporal window, suitability for audience (e.g., no "adult" themes for a prospectively juvenile audience), and other such criteria relating to the compatibility of the secondary content for the non-linear (primary) content and its audience.

The network architecture(s) of FIGS. 1-1d may further include one or more packaging processes or entities (not shown) in data communication with e.g., a network server (which may include a cloud or network DVR or PVR server). An exemplary packager performs a number of different functions, including: (i) transcoding of content; (ii) segmentation and associated processing; (iii) digital rights management (DRM) data processing and insertion; and (iv) secondary content insertion. The "packaged" streams are then distributed to the requesting users on an individual basis; i.e., per requesting device IP address via one or more routers and other network infrastructure (e.g., HSD/DOCSIS modem) of the distribution network (see, e.g., the network 100 of FIG. 1). Hence, each individual stream may be individually controlled (including trick-mode functionality if supported), individually tailored with inserted advertisements, individually tailored DRM, and even individually routed through the network infrastructure, including to multiple distinct clients within the same premises or household, thereby enabling multiple users within that premises to independently watch different recorded program elements.

In yet other implementations, the aforementioned content distribution network 100 comprises both "managed" and "unmanaged" (or off-network) services, so that a network operator can utilize both its own and external infrastructure to provide content delivery (including secondary content as part of the foregoing "bundles") to its subscribers in various locations and use cases. In one variant of this approach, network services are sent "over the top" of other provider's infrastructure, thereby making the service network substantially network-agnostic.

In another variant, a cooperative approach between service providers is utilized, so that features or capabilities present in one provider's network (e.g., authentication of mobile devices) can be leveraged by another provider operating in cooperation therewith.

Notwithstanding the foregoing, it will be appreciated that the various secondary content management aspects and functionalities of the present disclosure are effectively agnostic to the bearer network architecture or medium, and hence literally any type of delivery mechanism can be utilized consistent with the disclosure provided herein.

Secondary Content Management Architecture

Figure 2:
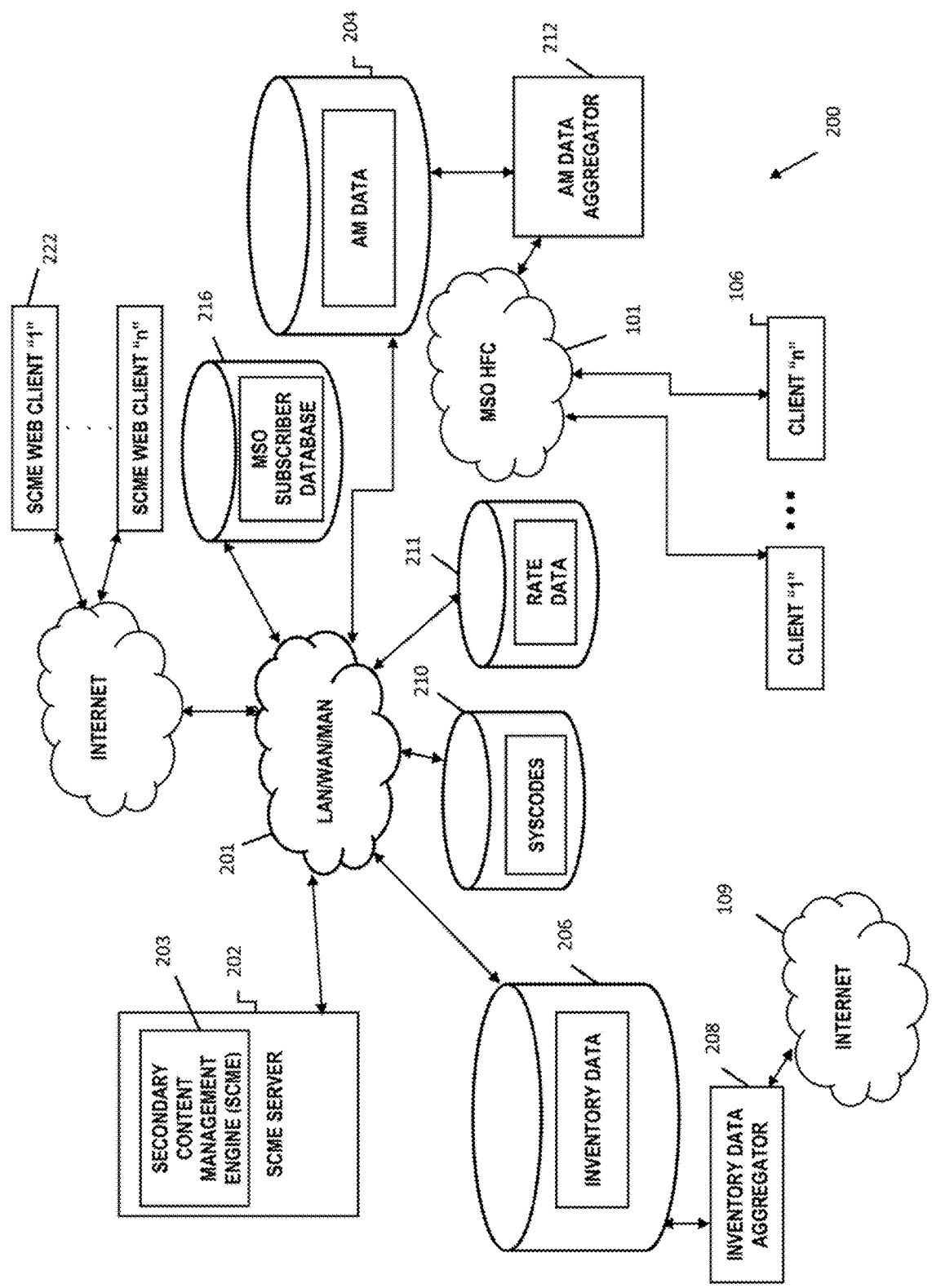
FIG. 2 is a functional block diagram illustrating one exemplary embodiment of a secondary content management architecture according to the present disclosure.

Referring now to FIG. 2, one embodiment of a network-based secondary content management architecture according to the present disclosure is described. As shown, the architecture 200 includes a number of different components, including a secondary content management engine (SCME) 203 running on an SCME server 202, an audience measurement (AM) aggregator 212 and associated AM database 204, a Syscode database 210, a rate data (e.g., "rate card") database 211, and an inventory database 206 and associated aggregator 208. The components are each in data communication with one another via a LAN/WAN/MAN 201, thereby enabling each of the components to be disposed at disparate locations if desired or required. Moreover, while the architecture 200 of FIG. 2 illustrates basically an MSO-based system, one or more of the foregoing components may be third-party owned or operated.

In operation, the SCME 203 obtains (via the SCME server 202) all of the necessary data for performance of the methodologies described below with respect to FIGS. 3-4g via the access network 201. In one implementation, the SCME process 203 comprises a number of different functional software modules, including protocols for making calls or "pulls" of data from the various databases and other entities. For example, in one variant, a data pull or request is made to the AM database 204, inventory database 206, Syscodes database 210, MSO subscriber database 216, and rate database 211 upon instigation from a higher layer process of the SCME 203, such as upon construction of a model according to FIG. 4 described below. These accesses are made using suitable pull technologies, e.g., Microsoft-.net technologies, for collecting data from the data sources. Alternatively, data from the various sources can be "pushed" (e.g., according to a periodic schedule, when updated, etc.) and stored locally within the SCME server 202.

The AM data aggregator 212 is in the illustrated embodiment a software process which obtains and aggregates audience measurement data from the various CPE or other client devices 106 of the MSO network, such as via an OOB upstream message from each subscriber's DSTB which includes tuning data, or alternatively via a network entity receiving or otherwise providing the tuning data (e.g., a switched server such as that of FIG. 1c herein). The AM aggregator may also parse or otherwise store the data along with data enabling the specific device to be identified (e.g., via MAC address or the like), as well as the service group or other information enabling a user of the AM data to sort or retrieve it based on geographic zone or other parameter of interest. In this manner, the SCME 203 can obtain AM data only for relevant subsets of the MSO subscriber pool (or the entirety thereof) when performing its analysis. It will be appreciated that while an MSO-based AM database and aggregator are shown, third party sources of data (e.g., so-called "TAM" systems and/or Nielsen-derived AM data) may be used consistent with the present disclosure as well.

Likewise, the inventory aggregator 208 comprises a software process which accesses third party and/or MSO data to determine an inventory of available spots within various content networks during a given time period. For instance, in one variant, the SCME 203 specifies a relevant time period (e.g., one broadcast month), and accordingly accesses the available inventory database 206 for relevant data. If such data is not available in the database 206, the aggregator 208 may query external databases or sources (via, e.g., the Internet 109 as shown) to obtain the necessary information. It will be recognized that while the aggregator 208 is shown as an MSO entity, in fact it may be wholly or partly managed (or its functionality provided) by a third party service.

Secondary Content Measurement Entity (SCME)

Figure 2A:
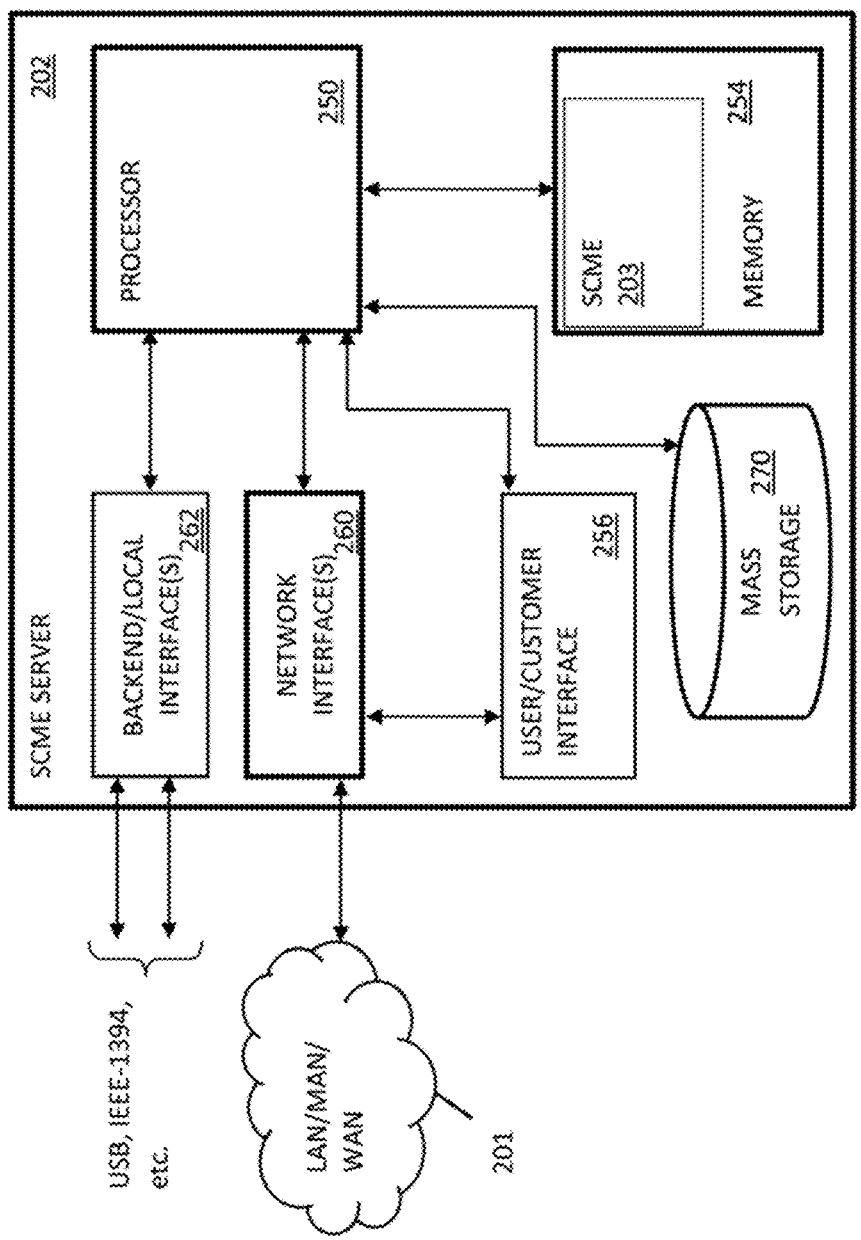
FIG. 2a is a functional block diagram illustrating an exemplary secondary content management entity (SCME) server configuration according to the present disclosure.

FIG. 2a illustrates one exemplary embodiment of a secondary content management entity 203 and server 202 useful with the present disclosure. As shown, the SCME server 202 generally comprises one or more network interfaces 260 for interfacing with other entities of the content delivery network 101 and/or the managed network headend 150 (including the LAN/MAN/WAN 201 of FIG. 2 as illustrated), a processor 250, a memory apparatus 254, mass storage 270 (e.g., RAID array, solid state drive (SSD), HDD, and/or NAND/NOR flash memory), and a plurality of backend or local interfaces 262 such as e.g., USB, IEEE-1394 (Fire Wire), Thunderbolt, IEEE Std. 802.11 (Wi-Fi), etc.

The SCME server 202 also includes a user or operator interface 256, which is useful for structuring schedules, conducting simulations, generating the output schedule data in a tangible form for provision to customers, generating reports, etc. In one embodiment, the user interface is implemented in a windowed software environment of the type well known in the computer arts, although other approaches may be used. Moreover, it is appreciated that the user interface 256 may also include a remote interface (such as via a web-based client application 222 shown in FIG. 2) for the customer, by which the customer can log in to a secure MSO server, review the various product offerings, provide input as to desired performance, markets, types of good/services, budget, provide payment source information, and other information needed by the SCME process 203 to perform the above-described methodologies.

In the illustrated embodiment, the SCME process 203 (i.e., computerized logic rendered as code) is implemented on one or more servers 202 (which may be geographically localized, such as in a server "farm", or alternatively distributed across multiple geographic regions), and may also be physically and/or logically integrated with other components of the MSO network, such as the aforementioned packaging entity, network management modules, etc.

In the illustrated implementation, the SCME server functionality is based on an exemplary Microsoft® SQL Server® Enterprise suite, although it will be appreciated that other configurations may be used consistent with the present disclosure. The exemplary SQL Server Enterprise suite provides, inter alia, high levels of speed/performance, encryption, local and "cloud" database access, and policy-based management. Specifically, SQL Server Reporting Services (SSRS) and SQL Server Analysis Services (SSAS) are two salient features of SQL Server that enable the exemplary SQL Server to provide the desired functionality in the exemplary embodiments, as well as enhanced data partitioning and dimensional table functionality.

As is well known, data warehouses are typically built using dimensional data models which include fact and dimension tables. Dimension tables are used to describe dimensions; they contain e.g., dimension keys, values and attributes. As but one example, an exemplary "time" dimension might contain chronological increments or references (e.g., hour, day, month, etc.). An exemplary product or service dimension could contain a name and description of products or services the MSO provides (e.g., advertising schedules for particular reach and frequency targets such as described above), their pricing, and other attributes as applicable such as Syscodes.

Dimension tables are often small; however, in the exemplary embodiment described herein, the dimension tables may grow to literally hundreds or thousands of entries or rows; e.g., one for each generated schedule, Syscode, advertiser or customer account, DMA/markets, etc.

Data warehouses may have multiple time dimensions as well. Since the warehouse may be used for finding and examining performance such as reach and frequency, it is often important to understand when each event has occurred; e.g., AM tuning events associated with subscriber client devices, airing or broadcast of certain ads, etc. A common time dimension is calendar time.

Fact tables may contain e.g., keys to dimension tables, as well as measurable facts useful to implementing the various algorithms described herein. For example, in one embodiment, the MSO might maintain a fact table recording provision of an advertising service or "product" to a given customer, or other such records.

Similar to data warehouses, such fact tables can grow very large, with thousands or even millions of rows in the exemplary context of a nationwide MSO with millions of subscribers and thousands of advertisers. This underscores some of the advantageous aspects of the present disclosure; i.e., efficient accumulation, storage, management, simulation/modeling, and utilization of possibly hundreds or thousands of entries (e.g., events) for thousands of advertisers (and tuning event data for millions of subscribers) is not only arduous, but effectively impossible using any manual processes, especially if the analysis, update, and offering of advertising products is to be implemented in a timely fashion (i.e., such that the latency between an advertiser wishing to engage in an advertising schedule or campaign, and the modeling, simulation, and actual implementation of the campaign is minimized).

It will be appreciated from the foregoing that various levels of "granularity" may be used in constructing the aforementioned data structures, depending on factors such as (i) availability of data (e.g., data may only be available in certain time increments, certain performance variables, etc.); (ii) desired frequency of simulation or analysis; (iii) desired end result or performance metrics, etc.

In implementation, the SCME application 203 comprises one or more computer programs with a plurality of instructions which when executed by the processor 250, cause the SCME to process the collected data and generate simulations, output schedules, etc. as described further below. In one implementation, the application computer program is rendered in a C # ("C Sharp") object-oriented programming language (C# was chosen in the exemplary embodiment for use of the .NET Framework, which provides large libraries with built in capabilities and methods useful in the context of the present disclosure), although it will be appreciated that other languages may be used consistent with the present disclosure. The activity data collection entity 208 processes the collected data by, for example, validating, analyzing, and/or normalizing the collected data to generate a database of user and activity information. The SCME 203 normalizes (if necessary) the data by, for example, extracting information from the data and organizing the extracted information into a predefined format. The extracted information may include e.g., a user identifier, an activity identifier, and a data and time stamp for the activity. Processing the collected data prepares the data for correlation with other additional data obtained from the other database sources of FIG. 2. The processed data (intermediary or final form) may be stored in the SCME server mass storage device 270; or alternatively attached local storage or even cloud storage (i.e., off-MSO network).

Methodology

Figure 3:
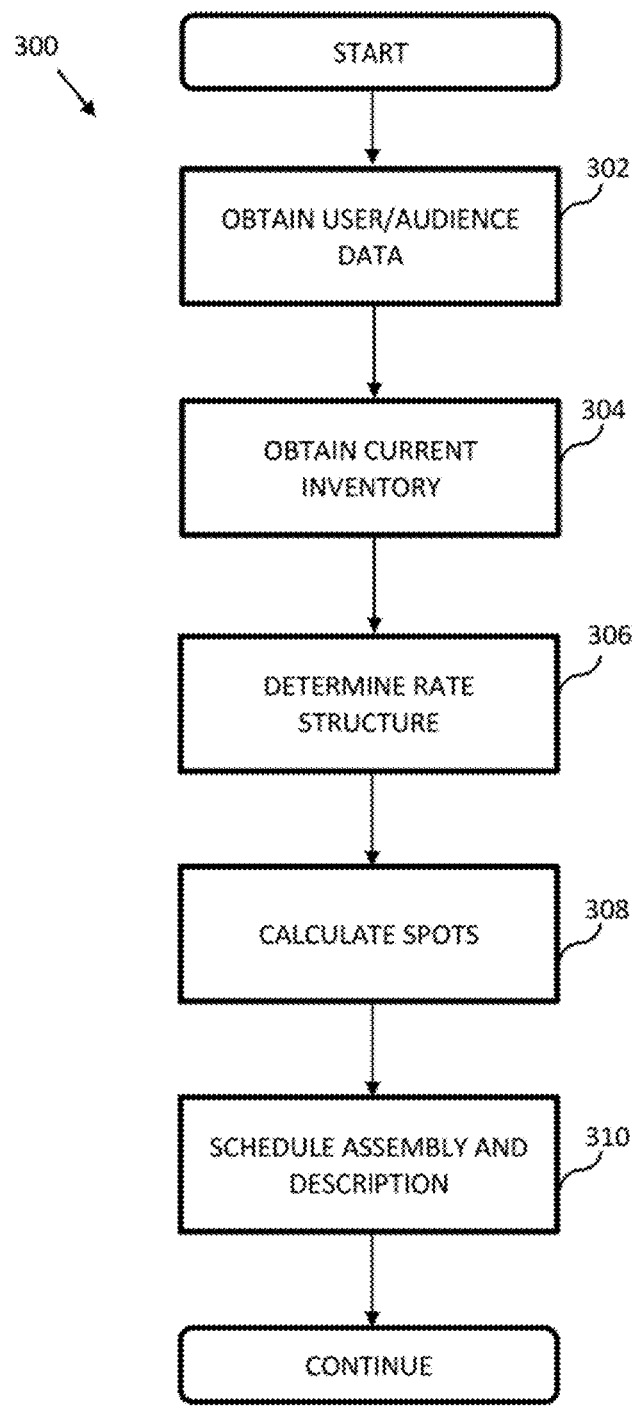
FIG. 3 is a logical flow diagram illustrating an exemplary embodiment of a generalized computerized method for managing secondary content (including generating content "bundles") according to the present disclosure.

FIG. 3 is a logical flow diagram illustrating an exemplary generalized method for managing secondary content within a managed network environment, in accordance with one embodiment of the present disclosure. As shown, the method 300 includes first obtaining user or audience data per step 302. As discussed in greater detail below, such data can be obtained from any number of different sources, including indigenous MSO or third party databases (e.g., an Audience Measurement database which represents an electronic census of user DSTB or other tuning events over a period of time, aggregated into a relational database).

It may also be related to or derived from any number of different populations (or subsets thereof), as well as having varying temporal relationships. For example, the data may be obtained (generally) from (i) the target consumers of the advertised product/service, e.g., the subscribers of the MSO's managed network only, (ii) based on data from non-subscriber persons (e.g., generated by a third party from the population at large), or (iii) a mixture of (i) and (ii).

The obtained data may be real-time or near-real time (such as is collected on an ongoing basis from subscribers via their DSTB tuning, online, or other activities), or may be historical in nature, such as where the data is associated with a particular temporal period (e.g., last calendar month), or an event (e.g., during the NFL Super Bowl of the prior year).

Next, per step 304, a current secondary content insertion "inventory" is obtained, whether from data already obtained by the system (e.g., stored in an MSO database), "pushed" to the MSO (such as via periodic updates from a network content provider or third party aggregating service), or retrieved via a query or data "pull" (e.g., to the network content provider or aggregator). In the exemplary embodiment, the inventory comprises data (files or records) indicative of placement opportunities available in the future, and their associated content provider network (e.g., three 30-second time slots during NBC Nightly News or the like). Such data may be individual in granularity (i.e., as to each individual slot), or aggregated at varying levels (i.e., as to multiple slots on the same content network, multiple slots at the same time but on different networks, and/or both). A standardized data format—e.g., "flat" csv (comma separated values) format—is utilized in the exemplary implementation in order to make compilation and sorting of the data efficient as possible. Next, per step 306 of the method 300, data indicating one or more rate structures is determined by the system. For example, in one implementation, data files are obtained from an MSO-maintained database, which indicate advertising rates to be applied to given slots/content networks. Such rates may be specified in relative or absolute numbers (e.g., $X, +$X<A>, or the like), or may be derived from a prescribed formula or set of formulas from which the desired rate can be determined by entering one or more arguments/variables. In an exemplary implementation (described below), a multi-tier pricing model is applied. The rate structure may also be non-static, such that even after a schedule is determined (step 310) and delivered to a customer, it may change based on e.g., prevailing conditions such as changes in demand, unforeseen events, etc.

Per step 308, the "spots" are calculated. In the exemplary embodiment, this calculation involves determining the number of individual spots that will achieve the desired performance or result (e.g., percentage of penetration and/or frequency, and/or other parametric target values). This can be determined by, inter alia, modeling and simulation based on prior performance data associated with individual selected advertisements or content elements (see detailed discussion below).

Per step 310, assembly of the schedule is performed. In the exemplary embodiment, the scheduling calculation takes into account: (a) the available inventory; (b) prescribed restrictions or screening criteria (e.g., customer budget and/or desires, if known); (c) the imported rate data; (d) the selected secondary content elements; and (e) the number of spots needed to attain the desired performance (i.e., results from step 308 above). The output of step 310 may be for instance an electronic schedule indicative of what content elements (e.g., advertisements) should be run in which slots on which content networks; this schedule can be fed back to a content packager such as that previously referenced.

Figure 3A:
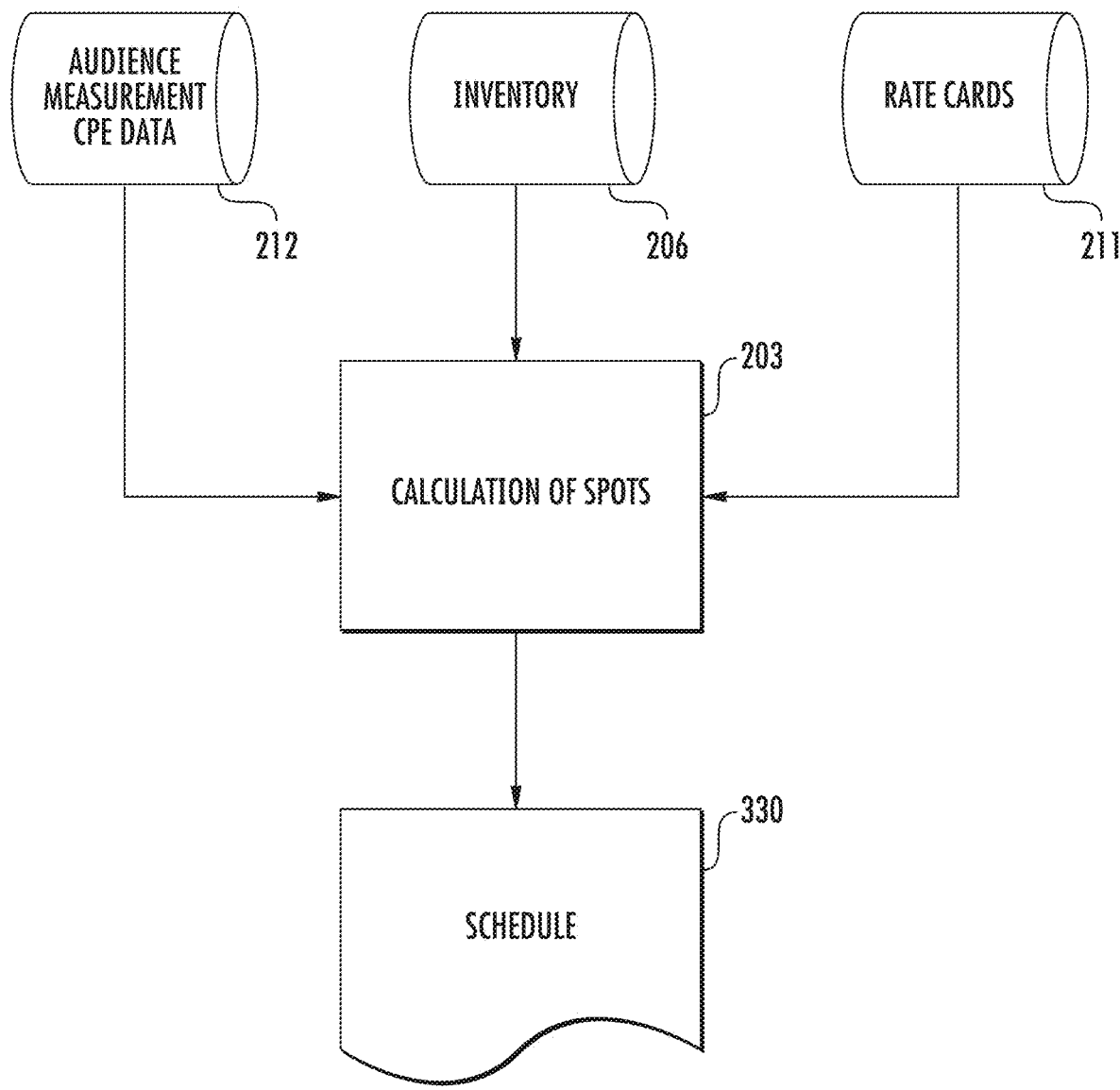
FIG. 3a is a logical block diagram illustrating the relationship of various data components and processes of the method of FIG. 3.

FIG. 3a is a graphic representation of one particular implementation of the methodology 300 of FIG. 3 by the computerized system of the present disclosure. As shown, audience measurement data (e.g., obtained from the MSO subscriber CPE (e.g., DSTB or other) is obtained from a first database 212 (FIG. 2), while the inventory and rate "cards" are obtained from respective databases 206, 211. Calculation of the spots is performed by the algorithmic logic of the SCME 203, the output of which 330 is the electronic or other scheduling information.

In the exemplary embodiment, the methodology 300 of FIG. 3 utilizes local advertising zone (e.g., system codes or "Syscodes") to generate schedules for use with "linear" (e.g., broadcast) content. A Syscode typically comprises a 4-digit code assigned by National Cable Communications Media (NCC) to represent a specific geography available for advertisement insertion, such as in a local region served by a cable network. A Syscode may represent a specific zone, a grouping of zones, an entire interconnect (i.e., aggregation of zones within a market or DMA), or even an interconnect and adjoining zones. A given subscriber (e.g., household or premises) may fall into several Syscodes.

Audience measurement (AM) data, (such as e.g., the data associated with the media consumption database of the assignee hereof relating to subscriber client device 106 usage and tuning events) is also used to determine an optimal "spot count" (i.e., number of individual advertising time slots) to reach a specific share of households or other target entities within a given advertising zone, and achieve a target frequency. As used herein, the term "reach" refers without limitation to the number of viewers that have seen an advertisement/campaign, while "frequency" refers without limitation to the number of discrete times a viewer has seen an advertisement/campaign. Hence, targets can be specified both in terms of reach and frequency (and in fact other parameters, such as e.g., impression quality). In an exemplary implementation, the reach targets are configurable, and are set to prescribed heuristic or "fuzzy" logic variable values such as "20%", "40%", and "60%", or "low", "medium", and "high" of households within one or more given advertising zones. The frequency for each of the targets can also be independently set, such as at discrete numerical values (e.g., 1, 2, and 3 times). So, for example, a given target "tuple" of {R, F} can be generated by the system, such as where an advertiser wishes 40% of a given zone to be "penetrated" to a depth of 2 impressions per viewer (i.e., 40% of the zone has seen the ad at least two different times).

Other examples of performance criteria that may be used consistent with the present disclosure might include: (i) percentage (%) of spots on a per-network tier basis, (ii) % of spots on a per-daypart basis (e.g., "morning drive", "primetime", "breakfast", etc.), or (iii) a numerical quantity of individual spots.

The foregoing schedules may optimized around a time frame, such as e.g., one (1) broadcast month, two (2) broadcast weeks, etc., are market-based, and are provided at the advertising zone (Syscode) level.

Once the spot counts are determined, a second month of historical data is selected, and the modeling simulations re-run (typically numerous times) to validate the previously determined spot counts. It will also be appreciated that where some disparity exists (e.g., the validation data aligns poorly with the modeled simulations), changes to the model/assumptions can be made and the simulations re-run to test the correlation, and/or other techniques can be used (such as averaging spot counts derived from varying sets of simulation assumptions and/or validation data, performing a linear regression, etc.).

Figure 4:
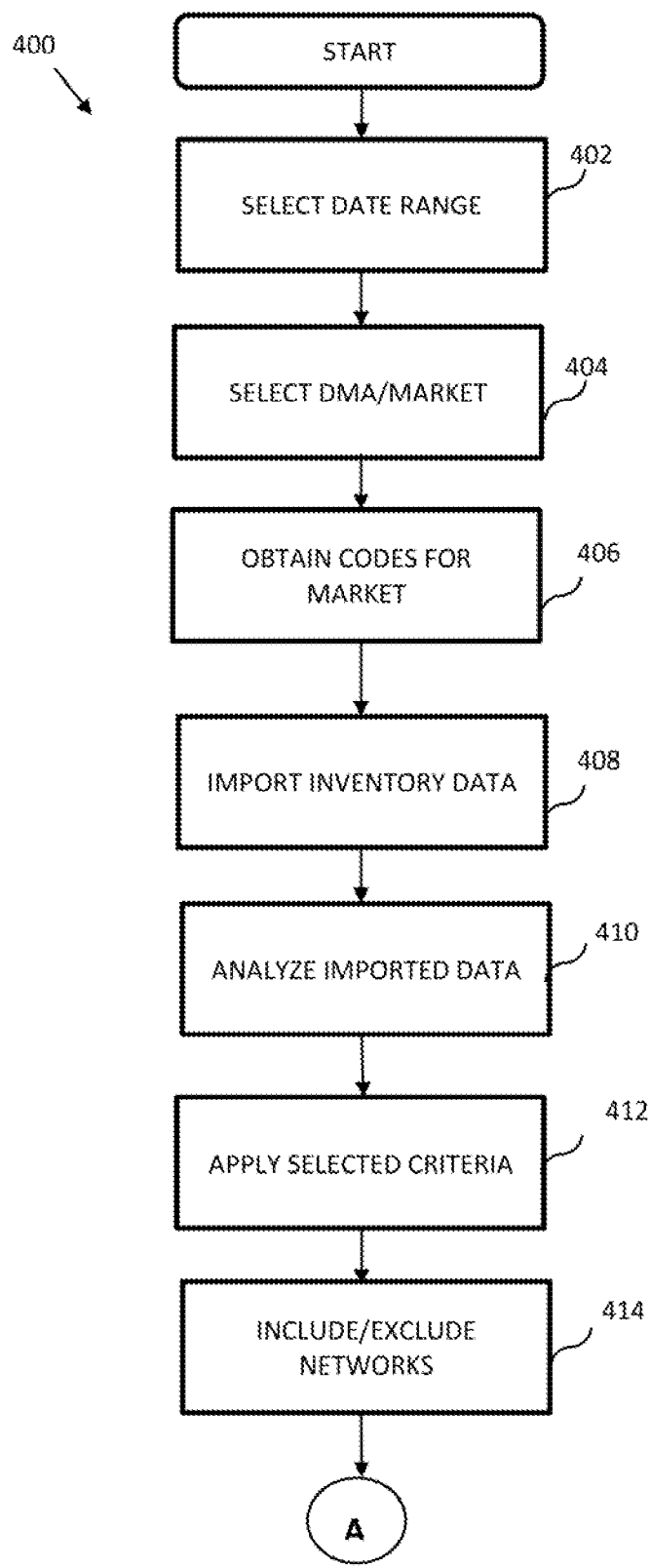
FIG. 4 is a logical flow diagram illustrating a particular implementation of the generalized method of FIG. 3, adapted for generation of advertising campaign schedules and products.
Figure 4:
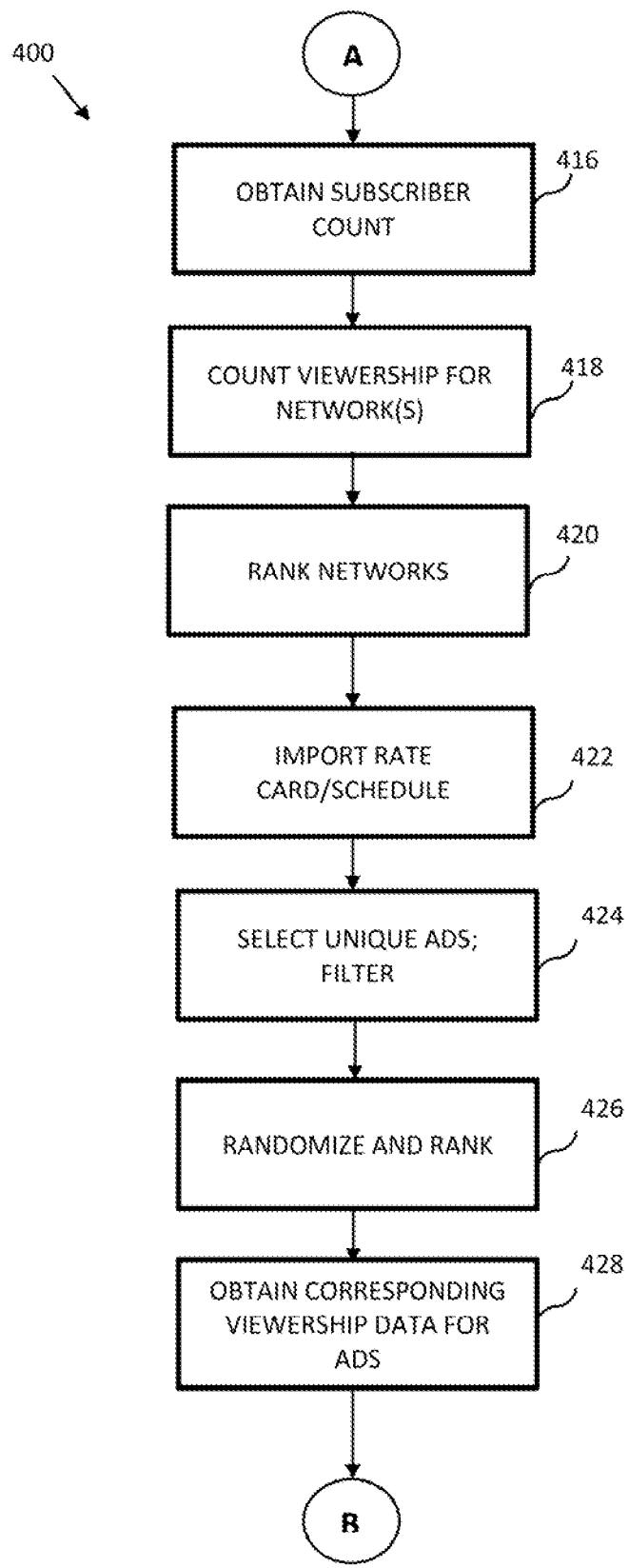
Figure 4:
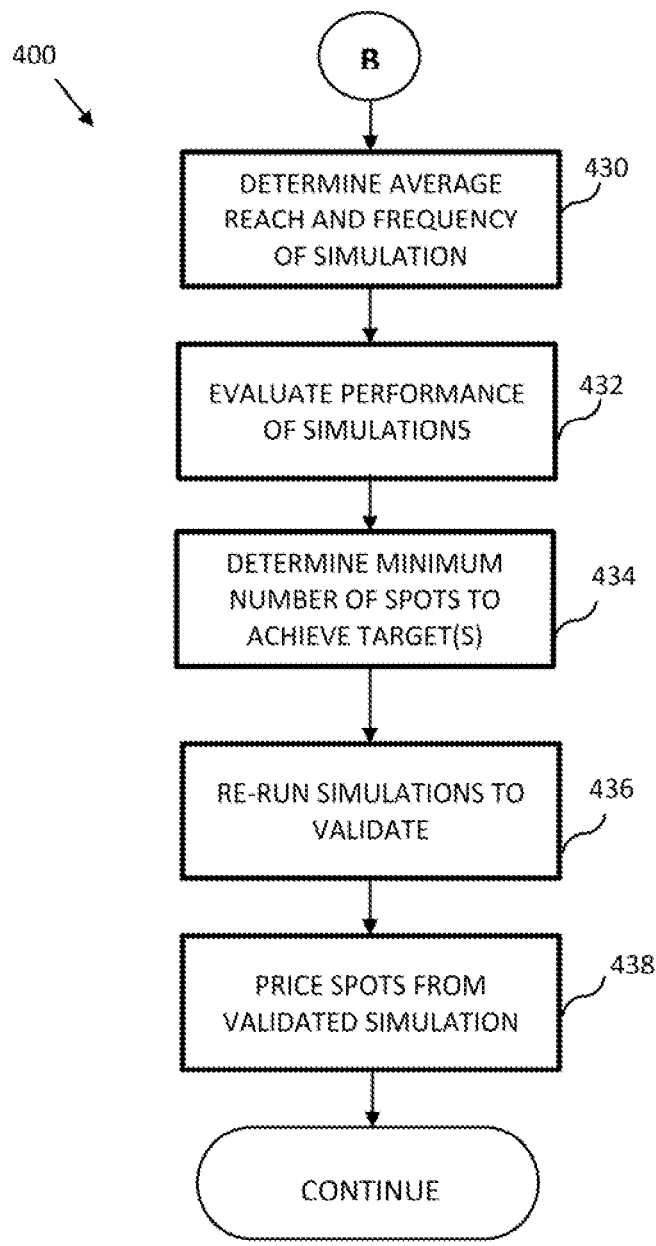
Figure 4A:
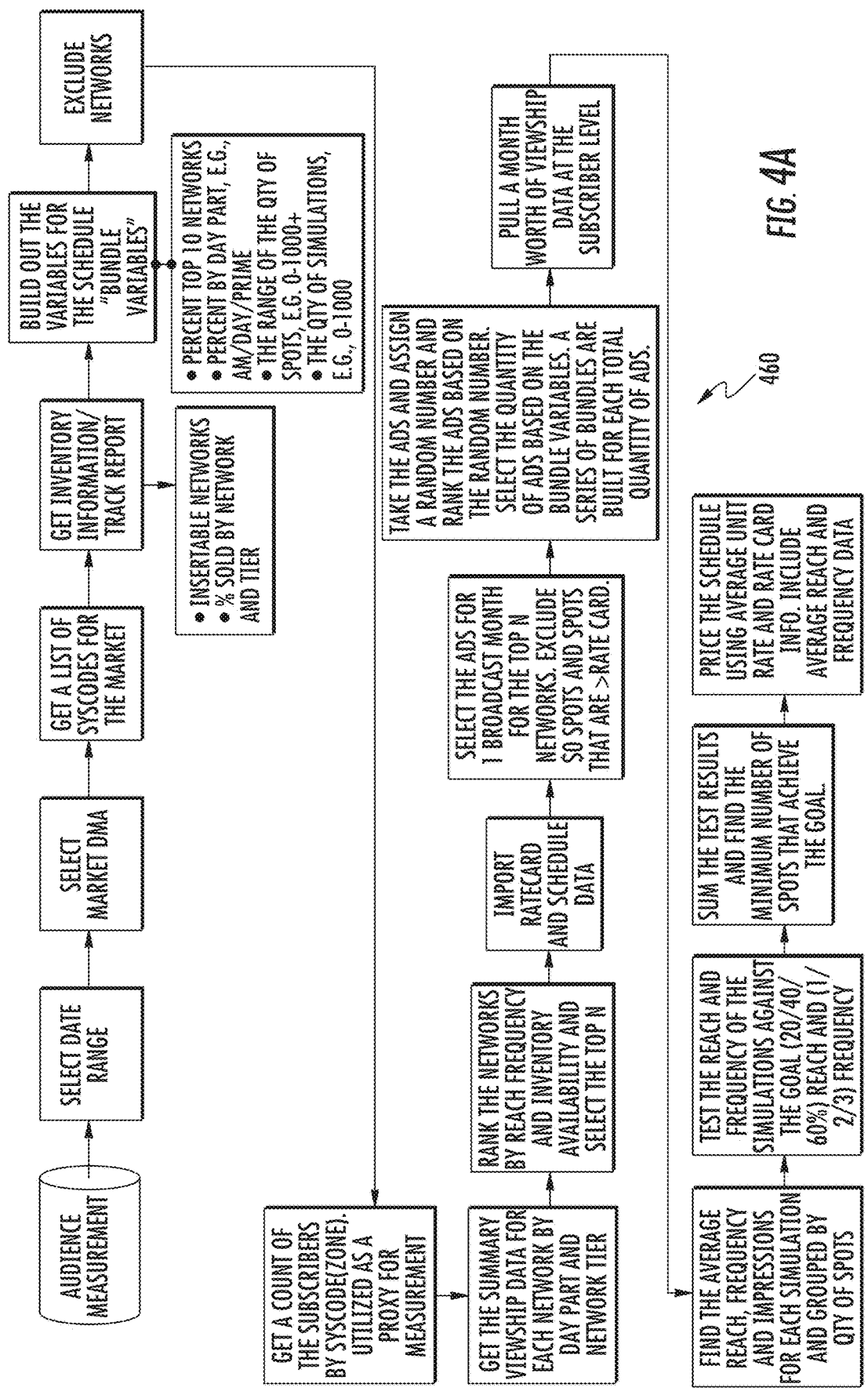
FIG. 4a is a logical block diagram illustrating the relationship of various logical processes of the method of FIG. 4.

Referring now to FIGS. 4 and 4a, one particular implementation of the generalized methodology 300 of FIG. 3 is shown and described in detail. It will be appreciated that while the following embodiment of the method 400 is described substantially as a sequence of steps, many of the described steps and processes: (i) may be performed concurrently or out of sequence with others of the steps; and (ii) may be iterative and/or optional in nature; e.g., performed recursively or on an as-needed basis. The logical flow 460 shown in FIG. 4a illustrates one particular implementation of the method 400 in the context of advertising content distributed within the aforementioned managed content distribution network.

As shown in FIG. 4, the method 400 starts with selection of a date range per step 402. Next, the Nielsen DMA (Designated Market Area) or other "market" are defined per step 404. In one embodiment, the market is defined in terms of geographic parameters (e.g., Southern California, San Diego metropolitan area), although it will be appreciated that the market may be defined according to other approaches (whether alone or in conjunction with the aforementioned geographic description), including without limitation by MSO distribution network sub-portions or service groups, IP addresses, service types (e.g., all high-speed data (HSD) subscribers), or yet other parameters. It is also appreciated that the "market" and DMA may or may not be synonymous, depending on the specification of the former.

Next, per step 406, the selected market/DMA from step 404 is correlated to one or more Syscodes, such as by logical entry into the Syscode database 210 using the various DMA/market parameters as search criteria.

Per steps 408 and 410, the inventory data is imported from the inventory database 206 and analyzed so as to find the content networks on which the MSO can insert secondary content such as advertisements, and to determine the amount (number, size) of available spots for a given content network.

Next, per step 412, the advertiser-selected criteria for performance or penetration are applied, such as those described supra.

Based on the criteria of step 412, the method 400 next chooses the networks to include in each advertising schedule in step 414. As part of this process, certain content networks may be excluded, such as based on their typical content, or to be reserved for future demand (i.e., planned use in another schedule or campaign). FIG. 4b illustrates one exemplary content network inclusion table structure 450, organized by advertisement zone code (alpha code for the region). In one exemplary embodiment, MSO-specific codes (e.g., RLDU or "retail unit code") are utilized, although generic or non MSO-specific codes may be used as well. Next, per step 416, a count of "subscribers" for a market is obtained. This information can be obtained for example from the MSO subscriber database 216 (FIG. 2). It is noted that the term "subscriber" in this context may refer to individual persons (such as individual users or family members with a household), the households or other entities themselves, or even specific client devices (e.g., DSTB versus portable device such as a tablet, Smart TV, etc.), as well subsets thereof (e.g., active TV-consuming households). This information is used to provide a quantity of subscribers (e.g., households) required to reach the prescribed performance targets.

Figure 4C:
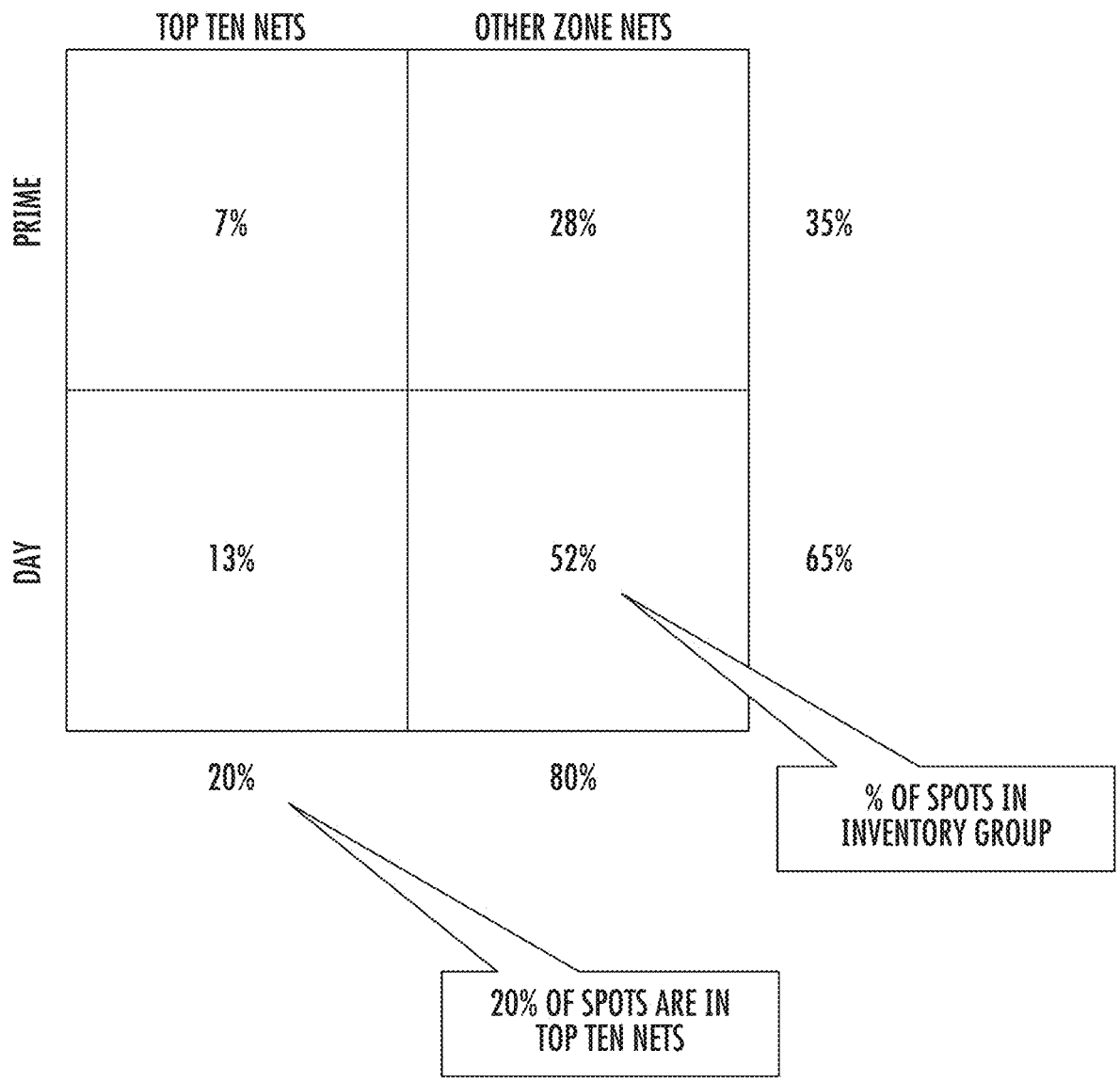
FIG. 4c is a graphical representation of one embodiment of an allocation of the advertising "spots" or insertion opportunities across: (i) a plurality of different content networks based on tier; and (ii) a plurality of different dayparts.

Per step 418, a count of the viewership for each content network is obtained, grouped by one or more prescribed criteria (e.g., by content network tier and/or daypart). Such grouping is constructed in order to appeal to clients, and ensure "clearance" (i.e., that an advertisement runs as assigned; if an advertisement's rate is too low, it can be replaced by a more highly placed spot). For instance, in one implementation, spots are allocated by network tier (e.g., allocated across "top 10" and "other" content networks; see FIG. 4c), and by daypart (e.g., between "prime time" and "daytime"; see FIG. 4c).

Figure 4D:
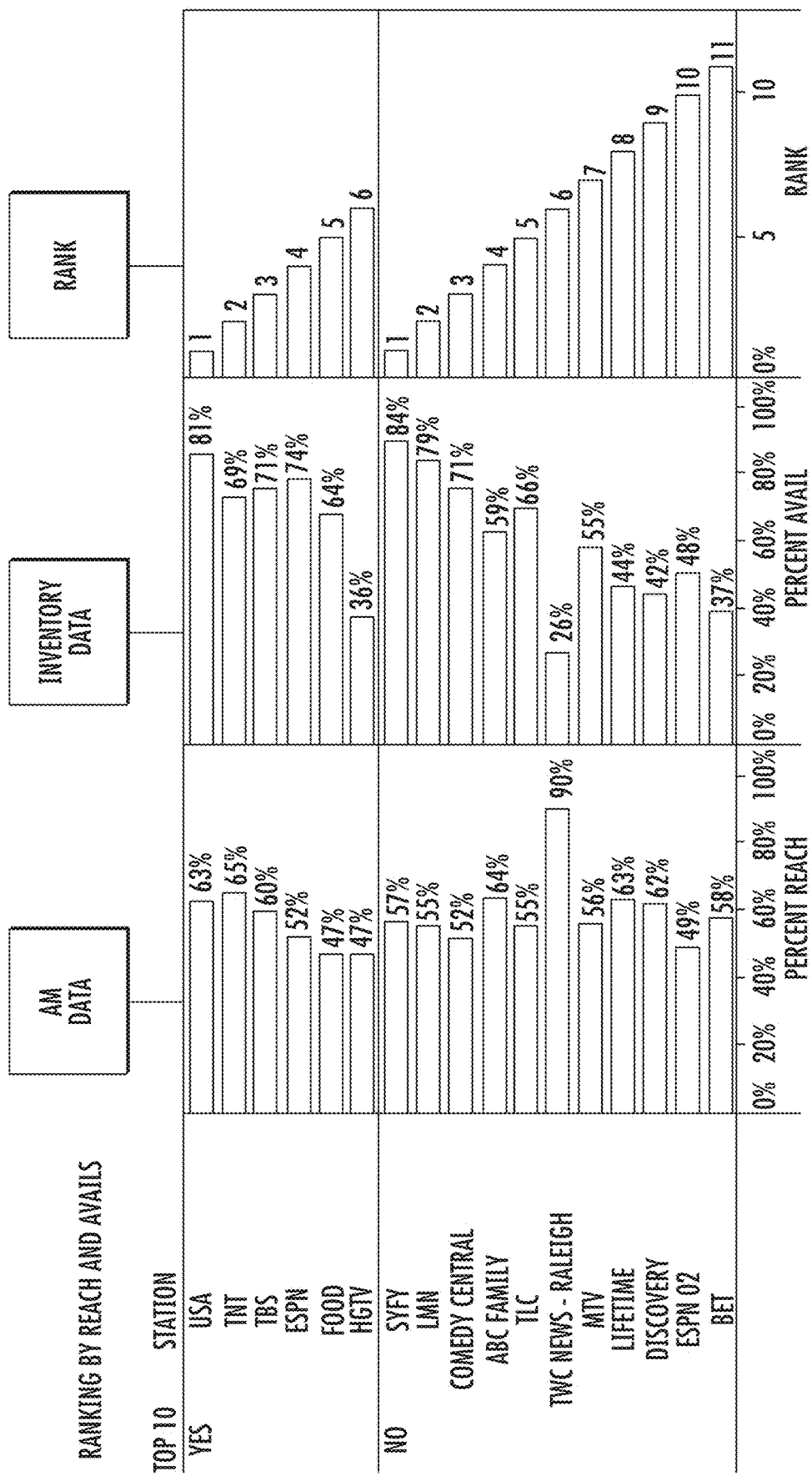
FIG. 4d is a graphical representation of one embodiment of a network ranking scheme according to the disclosure, wherein exemplary tiers of content networks are ranked based on audience measurement (AM) data and inventory data.

Per step 420, the selected content networks are ranked, such as based on reach, frequency and/or inventory availability (defined above). See for example the exemplary ranking of FIG. 4d, wherein exemplary "top 10" and non-top 10 content networks are ranked. In the illustrated implementation of FIG. 4d, the AM data referenced above for each content network (historical) is merged with inventory data to generate a sequential rank of the networks. Specifically, the rank is derived through a direct multiplication of the individual percentage (%) values shown on the chart; for example, USA network is ranked No. 1 in the "top 10" category because the multiplicative of its AM data percentage (63%) multiplied by the inventory data percentage (81%) yields a result greater than any of the less highly ranked networks. It will be appreciated, however, that other types of rankings and schemes may be utilized consistent with the methodology 400 as well. For instance, a rank for each content network for each of the three foregoing factors may be derived, and the factors weighted or otherwise valued so as to enable derivation of an aggregated or overall rank, and/or for filtration or refinement purposes (e.g., any of the ranked content networks might be excluded per step 414 if their "reach" attribute rank falls below a certain value). For example, Table 1 below illustrates one such exemplary weighting scheme, wherein a first network (Net1) scores higher in rank than a second network (Net2) in the aggregate, even though the second network has better reach:

TABLE 1

| Performance Attribute | Weight | Score - Net1 (% of target) | Attribute score (Net1) | Score - Net2 (% of target) | Attribute score (Net2) |
| --- | --- | --- | --- | --- | --- |
| Reach | 0.5 | 30 | 0.15 | 45 | 0.225 |
| Inventory Availability | 0.2 | 75 | 0.15 | 58 | 0.116 |
| Frequency | 0.3 | 65 | 0.195 | 33 | 0.099 |
| Sum | | | 0.495 | | 0.440 |

Per step 422, the relevant rate data (e.g., "rate card") for the target market/DMA is imported, as well as the timing schedule for the slots Next, per step 424, unique secondary content (e.g., advertisements) for the timeframe (e.g., part of day, time of day, or date range) selected in step 402 is selected. In the exemplary implementation, advertisements having an associated cost outside of certain prescribed criteria are excluded (e.g., less than a certain dollar floor, and greater than one or more rates specified on the rate card). As will be appreciated, rates for advertisements may vary based on e.g., time of day (prime time typically more than morning), proximity to other scheduled events, day of the week.

Per step 426, the selected advertisements from step 422 are each assign a random number, and then each random advertising event is ranked.) In one implementation, advertisements are selected based on the randomly assigned number falling within a range (e.g., all ads with numbers 1-1000). The quantity of advertisements for each daypart, network tier, and or other grouping criteria is also specified in this step.

Figure 4E:
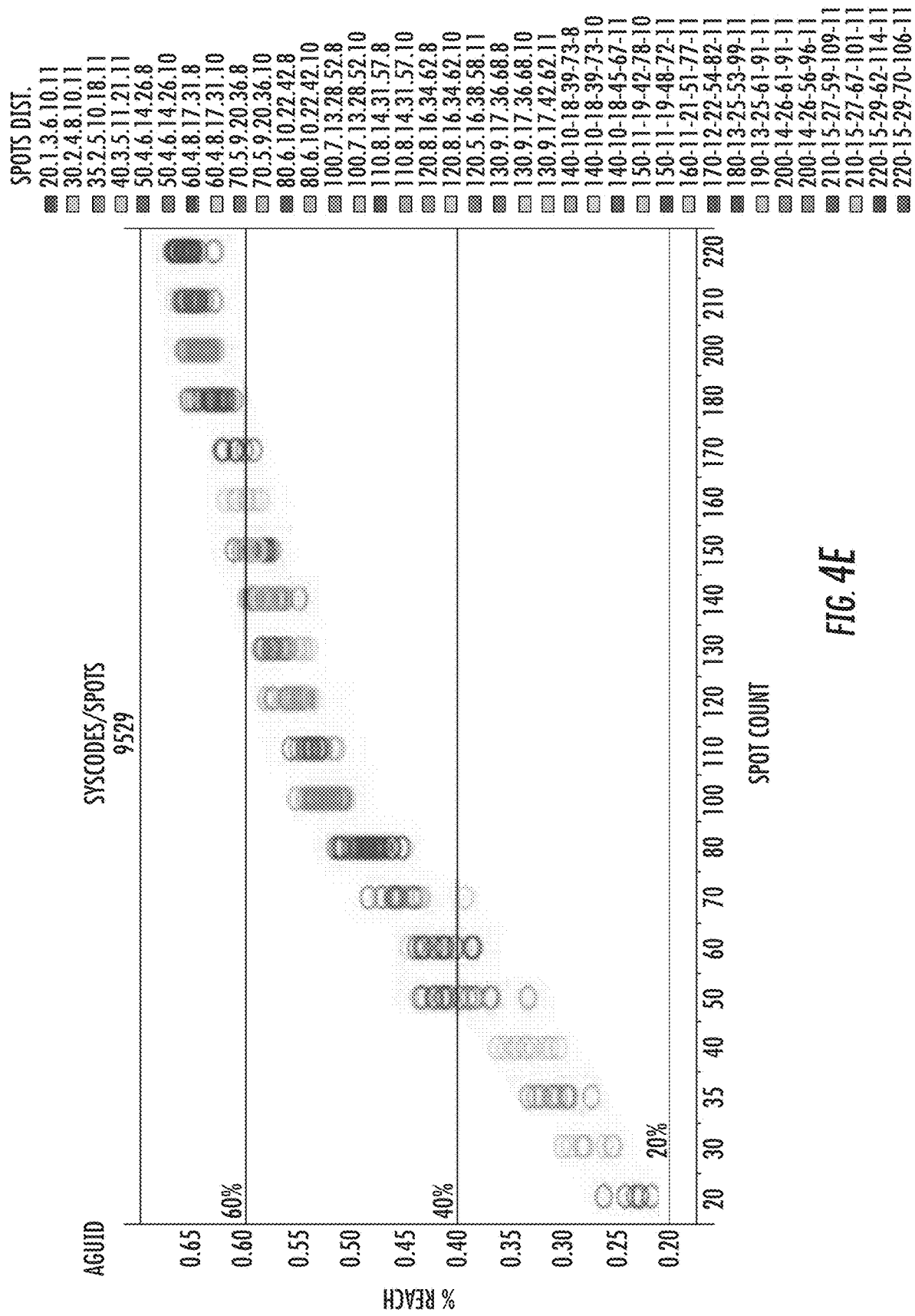
FIG. 4e is a graphical representation of an exemplary performance measure (i.e., percent "reach") plotted against spot count for a given Syscode, according to a plurality of different computer simulations.

FIG. 4e illustrates the relationship between the "reach" variable and different content network-spot loading. As shown, for a given Syscode, the reach increases generally proportional to the spot count, with the rate of reach increase declining over increased spot count due to, inter alia, market saturation. FIG. 4e is based on simulations run; i.e., spots are tested at various intervals to determine how many spots are required to reach the specified target. The ordinate (Y axis) is the % reach (% of the market that is being targeted), while the abscissa (X axis) represents the number of spots that being tested. Within each spot count, the number of networks and/or dayparts may be varied. The illustrated variation in color within a spot count in FIG. 4e represents a change in network or daypart mix, and each circle represents one (1) test run. When building the actual schedules, typically thousands of runs are performed to validate the spot counts generated by the simulation. Next, per step 428, the corresponding monthly viewership data for the advertisements selected in the prior steps are obtained, such as from audience measurement (AM) data. Per step 430, one or more simulations are run so as to identify the average performance (e.g., reach and frequency), and each simulation averaged for the quantity of spots. In one embodiment, the simulations are run for various network/spot count combinations, so as to determine an optimal network-specific spot count. In one exemplary implementation, a random sample of spots are selected, and tested to see if the target is achieved. If not, the number of spots is increased incrementally until the target is achieved.

Per step 432, the performance of the simulations is evaluated, including evaluating the number of times that the simulations for the number of ads achieved the prescribed performance target(s). From this data, the minimum number of spots necessary to achieve the target(s) is determined per step 434, such as via summing of the number of times that the simulation achieved the goal. In one exemplary implementation, the simulation must achieve the target (e.g., 95% of the time) for the spots quantity to be selected. For instance, one-thousand (1000) simulations are run per spot count; as such the target would have to be achieved 950 times. Based on this determination, the simulations are repeated, yet utilizing different source data (e.g., for a different month) to validate the spot counts (step 436).

Lastly, per step 438, the validated spot data from step 436 is used to assign a price the generated schedule, such as via use of the average unit rate, and include the reach, frequency and impression data.

In the exemplary embodiment, multiple (three) different suggested pricing models for customer advertising bundles are utilized, although it will be appreciated that more or less pricing models or tiers can be utilized consistent with the methodologies disclosed herein. Specifically, these three (3) models include: (i) a "rate card" model, wherein the spots are priced according to the preexisting market rate card (at their cost in rate cards (before any discounts; see discussion above); (ii) an effective rate model, wherein spots are priced according to the rate at which they were sold in the market (after discounts), and (iii) a blended rate model, wherein a certain category (e.g., top 10 prime spots) are priced according to one scheme such as a rate card, and all other spots are priced according to effective rate. In the exemplary implementation of the method 400 (see FIG. 4f), the AUR is obtained from the accessed AM data. Yet other models for pricing will be appreciated by those of ordinary skill given the present disclosure.

Figure 4G:
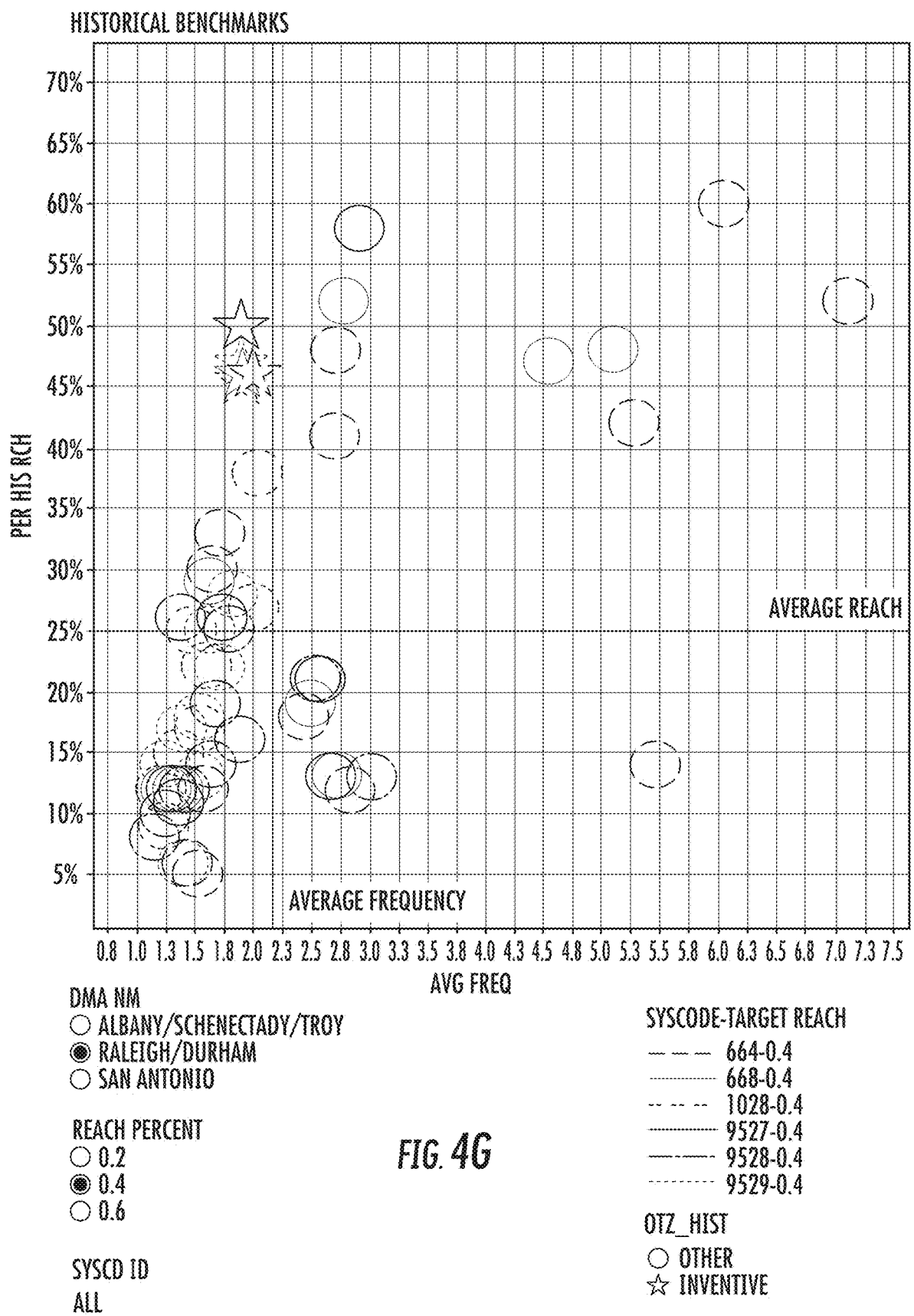
FIG. 4g is a plot of exemplary anecdotal performance data for advertising "bundles" generated by the computerized system of the present disclosure, illustrating its relationship to various prior art advertising campaign approaches.

FIG. 4g illustrates anecdotal performance data for exemplary software implementations of the foregoing method 400 constructed by the inventors hereof. As shown in FIG. 4g, for a selected DMA and reach target (i.e., 40%), the method 400 achieves good results in terms of reach and frequency. Specifically, as shown, schedules for the six (6) relevant Sycodes (i.e., 664, 668, 1028, 9527, 9528, and 9529) all exceeded 45% per-household reach, and frequencies between 1.8 and 2.0, as compared to historical data for the same Syscodes (i.e., each circle represents a historical campaign that ran during the selected time frame in the given market, with the color of the circles being based on Syscode). It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

It will be appreciated that while certain steps and aspects of the various methods and apparatus described herein may be performed by a human being, the disclosed computer technology improvements are computer-implemented, and computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of constructing secondary content bundles, the secondary content bundles comprising digitally encoded secondary content and configured for electronic distribution via a digital content distribution network, the computerized method comprising:

identifying, using at least one analytics engine executing on a computerized network apparatus, a plurality of secondary content insertion opportunities within a plurality of different linear or non-linear digitally encoded primary content data elements to be delivered over one or more respective content delivery networks;

based at least on the identified plurality of secondary content insertion opportunities, algorithmically selecting, via algorithmic logic of the analytics engine, a subset of the one or more respective content delivery networks;

based at least on the selected subset, running a plurality of first computerized simulations using the at least one analytics engine to generate data relating to one or more desired insertion opportunity counts, wherein the one or more desired insertion opportunity counts achieves one or more specified target performance criteria; and validating the determined one or more desired insertion opportunity counts using one or more second computerized simulations of the at least one analytics engine that are based on second input data different than first input data used for the plurality of first computerized simulations.

2. The computerized method of claim 1, wherein the determining the plurality of secondary content insertion opportunities within the plurality of linear or non-linear digitally encoded primary content data elements is based at least on allocation of the plurality of secondary content insertion opportunities across: (i) the one or more respective content delivery networks based on tier; and (ii) a plurality of different dayparts.

3. The computerized method of claim 2, wherein the allocation of the plurality of secondary content insertion opportunities across the one or more respective content delivery networks based on tier comprises allocation across a first tier comprising a prescribed percentage of top-ten popularity content networks, and allocation across a second tier comprising a prescribed percentage of non-top ten popularity content networks.

4. The computerized method of claim 3, wherein the allocation of the plurality of secondary content insertion opportunities across the plurality of linear or non-linear digitally encoded primary content data elements based on the plurality of different dayparts comprises allocation of the plurality of secondary content insertion opportunities across (i) a prime-time daypart and (ii) one or more non-prime time dayparts.

5. The computerized method of claim 1, wherein the selecting the subset of the one or more respective content delivery networks comprises selecting based at least on a ranking of each of the plurality of different content networks by at least one of reach or sellout rate.

6. The computerized method of claim 5, wherein the selecting the subset of the one or more respective content delivery networks comprises eliminating use of at least a portion of the one or more content delivery networks based on a content context associated with each of the one or more content delivery networks.

7. The computerized method of claim 1, wherein the validating using the one or more second computerized simulations that are based on the data different than the first input data used for the plurality of first computerized simulations comprises running the plurality of second computerized simulations based at least on historical network user tuning data associated with a time period different than an associated time period for historical network user tuning data used for the plurality of first computerized simulations.

8. The computerized method of claim 7, wherein the validating comprises achieving, using the one or more second computerized simulations, at least a prescribed level performance relative to one or more specified target performance criteria.

9. The computerized method of claim 8, wherein:
the one or more specified target performance criteria comprise: (i) a reach target, and (ii) a frequency target; and
the prescribed level performance relative to the one or more specified target performance criteria comprises at least ninety-five percent (95%) of both the reach target and the frequency target.

10. A computerized method of algorithmically constructing, in an automated fashion, secondary digital content bundles for use in one or more physical digital content distribution networks, the computerized method comprising:
identifying a subset of a plurality of logical content networks, the identifying performed by a computerized network apparatus utilizing a multi-algorithm analytics engine;
obtaining inventory data, the inventory data indicative of at least available secondary content insertion opportunities associated with the subset of the plurality of logical content networks;
running, using at least the multi-algorithm analytics engine, at least one first computerized modeling simulation to algorithmically generate data relating to a number of secondary digital content insertion opportunities needed to achieve one or more desired performance criteria; and
running, using at least the multi-algorithm analytics engine, at least one second computerized modeling simulation different than the at least one first computerized modeling simulation, to generate validation data relating to the number of secondary digital content insertion opportunities.

11. The computerized method of claim 10, further comprising:
obtaining first tuning data indicative of first historical tuning activity of a plurality of computerized user devices within the one or more physical digital content distribution networks; and
obtaining second tuning data indicative of second historical tuning activity of the plurality of computerized user devices; and
wherein the running the at least one first computerized modeling simulation comprises running the at least one first computerized modeling simulation using at least the first tuning data and the inventory data.

12. The computerized method of claim 11, wherein the running the at least one second computerized modeling simulation comprises running the at least one second computerized modeling simulation using at least the second tuning data and the inventory data.

13. The computerized method of claim 10, further comprising algorithmically generating at least one secondary content schedule using the generated data relating to the number of secondary content insertion opportunities.

14. The computerized method of claim 13, further comprising:
obtaining data relating to at least one restriction criteria associated with one or more customers of the digital content distribution network; and
algorithmically applying the at least one restriction criteria to the at least one secondary content schedule.

15. The computerized method of claim 11, wherein:
the obtaining the first tuning data comprises obtaining historical data associated with a first time frame; and
the obtaining the second tuning data comprises obtaining historical data associated with a second time frame, and wherein the first time frame is at least partially different from the second time frame.

16. The computerized method of claim 10, wherein the one or more desired performance criteria comprise at least one of (i) a reach-related parameter associated with a percentage of computerized user devices within the digital content distribution network, and (ii) a frequency-related parameter associated with a number of times per time frame that secondary digital content would reach a computerized user device within the one or more physical digital content distribution networks.

17. The computerized method of claim 10, further comprising:
obtaining rate structure data associated with the inventory data; and
applying a multi-model pricing structure algorithm to the at least one secondary content schedule using at least the rate structure data.

18. A low-latency computerized method of algorithmically constructing digital representations of secondary content bundles for use in association with a managed digital content distribution network, the computerized method comprising:
by executing a plurality of instructions of at least one analytics engine computer program on a digital processor apparatus of a computerized network server apparatus:
processing first data to generate second data identifying a plurality of opportunities for insertion of digital secondary content into digitally rendered primary content, the plurality of opportunities associated with a plurality of different logical content networks, the digitally rendered primary content of each of the plurality different logical content networks which may be distributed over one or more physical digital distribution networks;
selecting a subset of the plurality of different logical content networks using at least the second data, the selecting of the subset producing third data;
based at least on the third data, running at least one first computerized simulation using the at least one analytics engine computer program to calculate a first number of insertion opportunity counts which meet one or more specified target performance criteria, the first computerized simulation based on a predetermined computer simulation model encoded into the plurality or instructions of at least one analytics engine computer program;
running at least one second computerized simulation using the at least one analytics engine computer program to calculate a second number of insertion opportunity counts that meet the one or more specific target performance criteria, the at least one second computerized simulation based on the predetermined computer simulation model;
using at least the first number and the second number, adjusting at least one aspect of the predetermined computer simulation model to produce an adjusted model; and
re-running one or more of the at least one first computerized simulation and the at least one second computerized simulation using the adjusted model.

19. The computerized method of claim 18, wherein the using the first number and the second number comprises at least determining a discrepancy of a prescribed size between the first number and the second number; and
wherein the running of the at least one first and the at least one second computerized simulations comprises utilizing respective ones of data relating to respective different historical periods; and
wherein the adjusting comprises adjusting at least one underlying assumption of the predetermined computer simulation model relating to prospective viewer behavior.

20. The computerized method of claim 19, wherein the adjusting of the at least one underlying assumption of the predetermined computer simulation model relating to the prospective viewer behavior comprises adjusting an assumption regarding a constituency of a prospective audience of primary content during a particular programming event.

21. The method of claim 1, wherein at least the running of the plurality of first computerized simulations comprises running an algorithm configured to perform at least one of iterative or recursive simulations.

22. The computerized method of claim 10, wherein the obtaining of the inventory data indicative of the at least available secondary content insertion opportunities associated with the subset of the plurality of logical content networks comprises obtaining data indicative of particular temporal placement opportunities within digital content streams comprising primary digital content of respective ones of the plurality of logical content networks.

23. The computerized method of claim 10, wherein the generated data relating to the number of secondary digital content insertion opportunities needed to achieve the one or more desired performance criteria comprises data generated by comparing a result of the first computerized modeling simulation to data indicative of an acceptable range of values.

24. The computerized method of claim 18, wherein at least the processing, the selecting, the running of the at least one first computerized simulation, the running of the at least one second computerized simulation, the adjusting, and the re-running provide the constructing of the digital representations of the secondary content bundles within a time period not achievable by a human being.

* * * * *